United States Patent
Mimuro et al.

(10) Patent No.: US 8,422,890 B2
(45) Date of Patent: Apr. 16, 2013

(54) FIBER OUTPUT STABILIZER

(75) Inventors: Masakuni Mimuro, Chiba (JP); Kuniharu Himeno, Chiba (JP); Tomoharu Kitabayashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 257 days.

(21) Appl. No.: 12/757,190

(22) Filed: Apr. 9, 2010

(65) Prior Publication Data

US 2010/0260212 A1 Oct. 14, 2010

(30) Foreign Application Priority Data

Apr. 10, 2009 (JP) ................................ 2009-095570
Mar. 8, 2010 (JP) ................................ 2010-050414

(51) Int. Cl.
*H04B 10/08* (2006.01)
*H04B 10/04* (2006.01)
*H04J 14/02* (2006.01)

(52) U.S. Cl.
USPC .................. 398/195; 398/31; 398/33; 398/91

(58) Field of Classification Search ............. 398/31–34, 398/91, 147, 158, 159, 196, 197, 195
See application file for complete search history.

(56) References Cited

U.S. PATENT DOCUMENTS

| | | | | |
|---|---|---|---|---|
| 5,264,960 A * | 11/1993 | Glance | ........................... | 359/344 |
| 6,297,903 B1 * | 10/2001 | Grubb et al. | ............... | 359/341.3 |
| 6,507,431 B1 * | 1/2003 | Sugaya et al. | ........... | 359/341.32 |
| 6,738,184 B2 * | 5/2004 | Hayashi et al. | ............ | 359/341.4 |
| 7,388,891 B2 | 6/2008 | Uehara et al. | | |
| 7,436,863 B2 | 10/2008 | Matsuda et al. | | |
| 7,764,720 B1 * | 7/2010 | Bronder et al. | .................... | 372/6 |
| 8,041,231 B2 * | 10/2011 | Ohta | ............................. | 398/181 |
| 2005/0201432 A1 | 9/2005 | Uehara et al. | | |
| 2007/0164004 A1 | 7/2007 | Matsuda et al. | | |
| 2007/0258717 A1 * | 11/2007 | Hirano et al. | ................... | 398/92 |
| 2008/0137179 A1 * | 6/2008 | Li et al. | .................... | 359/337.13 |

FOREIGN PATENT DOCUMENTS

| | | |
|---|---|---|
| JP | 2003-347629 A | 12/2003 |
| JP | 2005-294806 A | 10/2005 |
| JP | 2007-190566 A | 8/2007 |

* cited by examiner

*Primary Examiner* — Dalzid Singh
(74) *Attorney, Agent, or Firm* — Westerman, Hattori, Daniels & Adrian, LLP

(57) ABSTRACT

A fiber output stabilizer according to an aspect of the invention stabilizes output light from a rare-earth doped optical fiber in which at least one kind of a rare-earth element is added to a core. The fiber output stabilizer includes: a monitoring light source that emits monitoring light having a wavelength shorter than that of excitation light exciting the rare-earth element; an optical multiplexer that multiplexes the monitoring light into the excitation light; an optical demultiplexer that demultiplexes the monitoring light passing through the rare-earth doped optical fiber; and a passing light detector that detects light intensity of the monitoring light from the optical demultiplexer.

26 Claims, 15 Drawing Sheets

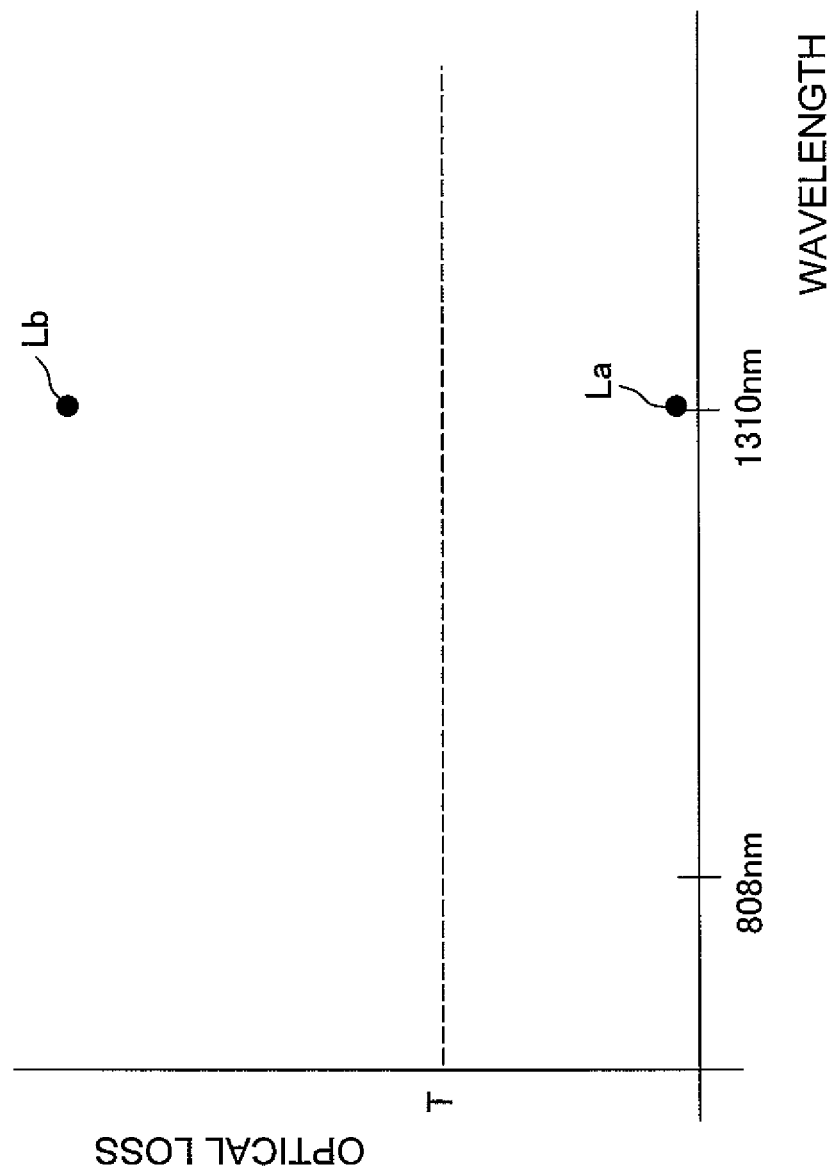

FIBER OUTPUT STABILIZER

CROSS-REFERENCE TO PRIOR APPLICATION

The present application is based on, and claims priority from, JP Application 2009-095570, filed Apr. 10, 2009, and JP Application 2010-050414, filed Mar. 8, 2010, the disclosure of which is hereby incorporated by reference herein in its entirety.

BACKGROUND OF THE INVENTION

1. Field of the Invention

The present invention relates to a fiber output stabilizer that stabilizes output from a rare-earth doped optical fiber, particularly to a technology for compensating a decrease in output caused by photodarkening.

2. Description of the Related Art

The rare-earth doped optical fiber is used as an optical fiber amplifier or a fiber laser because the incidence of excitation light to the rare-earth doped optical fiber radiates light having a specific wavelength.

The strong excitation light is incident to the rare-earth doped optical fiber when the rare-earth doped optical fiber is used as the fiber laser. At this point, there is generated a phenomenon called photodarkening in which a loss of the rare-earth doped optical fiber increases. Conventionally, in order to compensate the increase in loss caused by the photodarkening, fiber output is stabilized by controlling an exciting current, switching a reflectance of an output unit, or using a noise-like laser (for example, see Japanese Patent Application Laid-Open Nos. 2007-190566, 2003-347629, and 2005-294806).

In the rare-earth doped optical fiber, it is characteristically confirmed from experimental results that the increase in loss caused by the photodarkening increases as a wavelength is shortened. However, in a conventional fiber output stabilizer, the wavelength dependence is not taken into account in measuring the increase in loss.

Additionally, the light of the output wavelength of the fiber laser or the light of the wavelength of the signal light is used as monitoring light, which results in a problem in that the output of the fiber laser or signal light decreases.

SUMMARY OF THE INVENTION

An object of the invention is to correctly measure the increase in loss caused by photodarkening to stabilize the output from a rare-earth doped optical fiber.

In order to solve the problem, one of features of the invention is that light having a wavelength shorter than that of the excitation light exciting a rare-earth element is utilized as the monitoring light used to measure the increase in loss caused by the photodarkening in the rare-earth doped optical fiber of the fiber output stabilizer of the invention.

Specifically, in accordance with an aspect of the invention, a fiber output stabilizer includes: a rare-earth doped optical fiber in which at least one kind of a rare-earth element is added to a core; an excitation light source that supplies excitation light exciting the rare-earth element to the rare-earth doped optical fiber; a monitoring light source that emits monitoring light having a wavelength shorter than that of the excitation light source; an optical multiplexer that multiplexes the monitoring light emitted from the monitoring light source into the excitation light; and a passing light detector that detects light intensity of the monitoring light passing through the rare-earth doped optical fiber.

Specifically, in accordance with an aspect of the invention, a fiber output stabilizer includes: a rare-earth doped optical fiber in which at least one kind of a rare-earth element is added to a core; an excitation light source that supplies excitation light exciting the rare-earth element to the rare-earth doped optical fiber; a monitoring light source that emits monitoring light having a wavelength shorter than that of the excitation light source; an optical multiplexer that multiplexes the monitoring light emitted from the monitoring light source into the excitation light; an optical demultiplexer that demultiplexes the monitoring light passing through the rare-earth doped optical fiber; and a passing light detector that detects light intensity of the monitoring light from the optical demultiplexer.

Specifically, in accordance with an aspect of the invention, a fiber output stabilizer includes: a rare-earth doped optical fiber in which at least one kind of a rare-earth element is added to a core; an excitation light source that supplies excitation light exciting the rare-earth element to the rare-earth doped optical fiber; a monitoring light source that emits monitoring light having a wavelength shorter than that of the excitation light source; an optical multiplexer/demultiplexer that multiplexes the monitoring light emitted from the monitoring light source into the excitation light while demultiplexes the monitoring light reflected from the rare-earth doped optical fiber; a monitoring light reflecting mirror that reflects the monitoring light passing through the rare-earth doped optical fiber toward the optical multiplexer/demultiplexer; and a passing light detector that detects light intensity of the monitoring light from the optical demultiplexer.

Because the wavelength of the monitoring light is shorter than that of excitation light, the increase in loss is larger than the loss of the output light from the rare-earth doped optical fiber. Therefore, the increase in loss can correctly be measured in the rare-earth doped optical fiber to correctly predict the decrease in output from the rare-earth doped optical fiber. When the output intensity of the excitation light source increases so as to compensate the predicted decrease in output, the output intensity from the rare-earth doped optical fiber can substantially be kept constant.

The wavelength of monitoring light differs from the excitation wavelength in the rare-earth doped optical fiber. Therefore, the output intensity from the rare-earth doped optical fiber does not decrease, when the wavelength separation filter is used as the optical demultiplexer.

Preferably the fiber output stabilizer in accordance with an aspect of the invention further includes: a monitoring light detector that detects light intensity of the monitoring light emitted from the monitoring light source; a monitoring light intensity comparator that detects a difference between the light intensity detected by the passing light detector and the light intensity detected by the monitoring light detector; and an output intensity changing unit that changes the output intensity of the excitation light source to light intensity previously determined according to the difference detected by the monitoring light intensity comparator.

The decrease in output from the rare-earth doped optical fiber can correctly be predicted by the difference detected by the monitoring light intensity comparator.

Preferably the fiber output stabilizer in accordance with an aspect of the invention further includes: a monitoring light control unit that maintains regular light intensity of the monitoring light emitted from the monitoring light source; a fixed light intensity comparator that detects a difference between the light intensity detected by the passing light detector and predetermined light intensity; and an output intensity changing unit that changes the output intensity of the excitation light source to light intensity previously determined according to the difference detected by the fixed light intensity comparator.

The decrease in output from the rare-earth doped optical fiber can correctly be predicted by the difference detected by the fixed light intensity comparator.

Preferably the fiber output stabilizer in accordance with an aspect of the invention further includes one set of reflecting mirrors that is disposed at two points separated from each other in the rare-earth doped optical fiber, reflecting light radiated from the rare-earth element to perform laser oscillation in the rare-earth doped optical fiber.

The rare-earth doped optical fiber can be used as the fiber laser. At this point, even if the strong excitation light impinges on the rare-earth doped optical fiber, the output intensity from the rare-earth doped optical fiber can substantially be kept constant.

In the fiber output stabilizer in accordance with the an aspect of the invention, preferably the wavelength of the monitoring light is shorter than an absorption wavelength band of the rare-earth element.

The monitoring light is not absorbed by the rare-earth element so that the increase in loss of the monitoring light due to the photodarkening can correctly be measured.

In the fiber output stabilizer in accordance with an aspect of the invention, preferably Yb is used as the rare-earth element, and the wavelength of the monitoring light ranges from 600 nm to 850 nm.

The absorption band of the Yb-doped optical fiber ranges from 850 nm to 1050 nm. On the other hand, when the wavelength of the monitoring light is lower than 600 nm, the influence of the increase in loss caused by the photodarkening is strengthened. Accordingly, when the Yb-doped optical fiber is used as the rare-earth doped optical fiber, the output intensity from the rare-earth doped optical fiber can approximately be kept constant.

In the fiber output stabilizer in accordance with an aspect of the invention, preferably the one set of reflecting mirrors is disposed in the way of an optical path between the optical multiplexer and the optical demultiplexer.

The optical multiplexer and the optical demultiplexer are not disposed between the one set of reflecting mirrors, so that the influences of the losses of the optical multiplexer and optical demultiplexer in the laser microcavity can be avoided. Therefore, the output intensity from the rare-earth doped optical fiber can be kept constant.

In the fiber output stabilizer in accordance with an aspect of the invention, preferably the optical multiplexer and the optical demultiplexer are disposed in the way of an optical path between the one set of reflecting mirrors.

The passing light detector detects the light intensity of the monitoring light that does not pass through the reflecting mirror, so that the loss of the monitoring light at the reflecting mirror can be avoided. Therefore, the increase in loss can correctly be measured in the rare-earth doped optical fiber.

Preferably the fiber output stabilizer in accordance with an aspect of the invention further includes: a disconnection detecting light source that emits disconnection detecting light having a wavelength longer than an absorption wavelength band of the rare-earth element to the rare-earth doped optical fiber; and a disconnection detecting light detector that detects the disconnection detecting light passing through the rare-earth doped optical fiber.

Because the fiber output stabilizer includes the disconnection detecting light source and the disconnection detecting light detector, the fiber output stabilizer can determine whether the light intensity of the disconnection detecting light passing through the rare-earth doped optical fiber is smaller than a predetermined value. At this point, because the wavelength of the disconnection detecting light is longer than the absorption wavelength band of the rare-earth element, the disconnection detecting light is not absorbed by the rare-earth doped optical fiber, and is not influenced by the photodarkening. Therefore, the determination whether the decrease in light intensity of the monitoring light is caused by the photodarkening or the disconnection can be made based on whether the light intensity of the disconnection detecting light is smaller than the predetermined value.

In the fiber output stabilizer in accordance with an aspect of the invention, preferably the excitation light emitted from the excitation light source is stopped when light intensity of the disconnection detecting light detected by the disconnection detecting light detector is lower than a predetermined value.

The rare-earth doped optical fiber is disconnected, when the light intensity of the disconnection detecting light detected by the disconnection detecting light detector is lower than the predetermined value. At this point, damage of the excitation light source and other optical components due to the output excitation light can be prevented by stopping the excitation light emitted from the excitation light source.

According to the invention, the output from the rare-earth doped optical fiber can be stabilized by correctly measuring the decrease in output caused by the photodarkening.

BRIEF DESCRIPTION OF THE DRAWINGS

FIG. 15 illustrates an example of detection result of disconnection detecting light.

DESCRIPTION OF THE PREFERRED EMBODIMENT

Embodiments of the invention will be described below with reference to the accompanying drawings. The following embodiments of the invention are described only by way of example, and the invention is not limited to the embodiments.

First Embodiment

Figure 1:
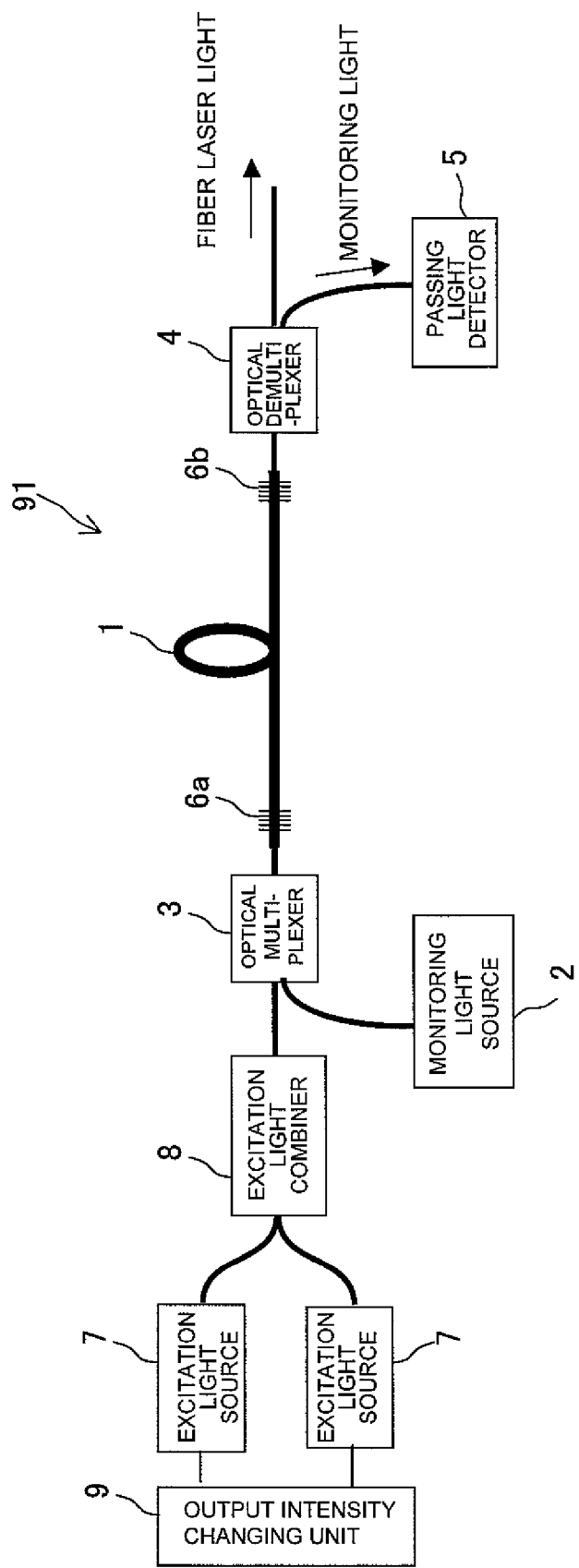
FIG. 1 is a schematic diagram illustrating a configuration of a fiber output stabilizer according to a first embodiment of the invention.

FIG. 1 is a schematic diagram illustrating a configuration of a fiber output stabilizer according to a first embodiment of the invention. A fiber output stabilizer 91 of the first embodiment is a configuration example when a rare-earth doped optical fiber 1 is used as the fiber laser. Specifically, the fiber output stabilizer 91 includes a rare-earth doped optical fiber 1, a monitoring light source 2, an optical multiplexer 3, an optical demultiplexer 4, a passing light detector 5, and reflecting mirrors 6a and 6b and stabilizes output light from the rare-earth doped optical fiber 1, that is, light intensity of a fiber laser light.

The rare-earth doped optical fiber 1 is an optical fiber in which at least one kind of a rare-earth element is added to a core. The rare-earth doped optical fiber 1 is used as a gain medium of the fiber laser or an optical fiber amplifier. Preferably Yb is used as the rare-earth element. Preferably the rare-earth doped optical fiber 1 has a double clad structure, in which a circumference of the clad is covered with resin having a refractive index lower than that of the clad, such that high-intensity excitation light can impinge on the rare-earth doped optical fiber 1.

In the first embodiment, because the rare-earth doped optical fiber 1 is used as the fiber laser, preferably strong excitation light impinges on the rare-earth doped optical fiber 1. Therefore, the fiber output stabilizer 91 includes plural excitation light sources 7 and an excitation light combiner 8 that multiplexes pieces of excitation light from the plural excitation light sources 7. The excitation light source 7 supplies the excitation light that excites the rare-earth element to the rare-earth doped optical fiber 1. Preferably each excitation light source 7 is formed by a semiconductor laser for the viewpoints of stability of output wavelength and output intensity. In such cases, the output intensity from the excitation light source 7 can be adjusted using an output intensity changing unit 9 that controls a driving current of the semiconductor laser.

In the rare-earth doped optical fiber 1, reflecting mirrors 6a and 6b are provided at two points separated from each other. The reflecting mirrors 6a and 6b, which are provided at two points separated from each other in the rare-earth doped optical fiber 1, act as an oscillator that reflects the radiation light from the rare-earth element to perform laser oscillation in the rare-earth doped optical fiber 1. Therefore, the rare-earth doped optical fiber 1 can be used as the fiber laser. FBG (Fiber Bragg Grating) can be used as the reflecting mirrors 6a and 6b. Preferably the reflecting mirrors 6a and 6b are provided at both ends of the rare-earth doped optical fiber 1.

The excitation light emitted from the excitation light source 7 impinges on the rare-earth doped optical fiber 1 through the optical multiplexer 3 and the reflecting mirror 6a. Each of the one set of reflecting mirrors 6a and 6b reflects a desired light having a wavelength, and the one set of reflecting mirrors 6a and 6b and the rare-earth doped optical fiber 1 constitute a laser microcavity, which allows the laser oscillation to be performed in the light impinging on the rare-earth doped optical fiber 1. The laser light laser-oscillated by the rare-earth doped optical fiber 1 is output from the reflecting mirror 6b. For example, when Yb is used as the rare-earth element, the Yb-doped optical fiber has an absorption band of 850 nm to 1050 nm. At this point, when the excitation light source 7 emits the excitation light having a wavelength of 915 nm, the reflecting mirror 6b emits the fiber laser light having the wavelength of 1064 nm.

Reflectances of the reflecting mirrors 6a and 6b may be identical to each other or different from each other. However, preferably the reflectance of the reflecting mirror 6a disposed on the side of the excitation light source 7 is higher than that of the reflecting mirror 6b. At this point, preferably the reflectance of the reflecting mirror 6b ranges from 4% to 10%. The laser output power depends on a ratio of the light returning to the laser microcavity and the laser output light, and the laser output is enhanced as the reflectance of the reflecting mirror 6b decreases. On the other hand, when the reflectance is lower than 4%, possibly the returning light impinges on the excitation light source 7 by self-oscillation in low excitation power. Therefore, the reflectance of the reflecting mirror 6b is set to the range of 4% to 10%.

The monitoring light source 2 emits monitoring light having a wavelength shorter than that of the excitation light emitted from the excitation light source 7. The optical multiplexer 3 multiplexes the monitoring light emitted from the monitoring light source 2 into the excitation light. The optical demultiplexer 4 demultiplexes the monitoring light passing through the rare-earth doped optical fiber 1. The passing light detector 5 detects the light intensity of the monitoring light from the optical demultiplexer 4. The excitation light combiner 8 may be used as the optical multiplexer 3. In such cases, the excitation light combiner 8 multiplexes the monitoring light from the monitoring light source 2 into the excitation light.

The one set of reflecting mirrors 6a and 6b are disposed in the way of an optical path between the optical multiplexer 3 and the optical demultiplexer 4. Therefore, influences of the losses in the optical multiplexer 3 and optical demultiplexer 4 of the laser microcavity can be avoided. Preferably the optical demultiplexer 4 is a wavelength separation filter that selectively separates the wavelength of the monitoring light in order to avoid the decrease in output intensity of the fiber laser. Preferably the wavelength separation filter is a fiber type WDM coupler having a fusion stretching structure. Preferably the wavelength separation filter is a multilayer filter.

In the first embodiment, in order to cause the high-intensity excitation light to impinge on the rare-earth doped optical fiber 1, the pieces of light from the plural excitation light sources 7 are optically coupled by the excitation light combiner 8 and supplied to the rare-earth doped optical fiber 1. The semiconductor laser is used as the excitation light source 7, and the excitation light source 7 is operated by the output intensity changing unit 9. The monitoring light having the wavelength shorter than the oscillation wavelength of the fiber laser is caused to impinge on the rare-earth doped optical fiber 1 from the monitoring light source 2, the monitoring light passing through the rare-earth doped optical fiber 1 is demultiplexed from the fiber laser light by the optical demultiplexer 4, and the light intensity of the monitoring light is detected by the passing light detector 5. The output intensity changing unit 9 previously stores reference light intensity therein, compares the reference light intensity and the light intensity of the monitoring light detected by the passing light detector 5, measures the decrease in light intensity of the monitoring light, and controls the driving current of the excitation light source 7 according to the decrease in light intensity of the monitoring light. At this point, for example, the reference light intensity is light intensity of the monitoring light detected by the passing light detector 5 when the photodarkening is not generated in the rare-earth doped optical fiber 1. Therefore, the output intensity changing unit 9 can perform the control such that the output state from the fiber laser is kept constant.

Figure 6:
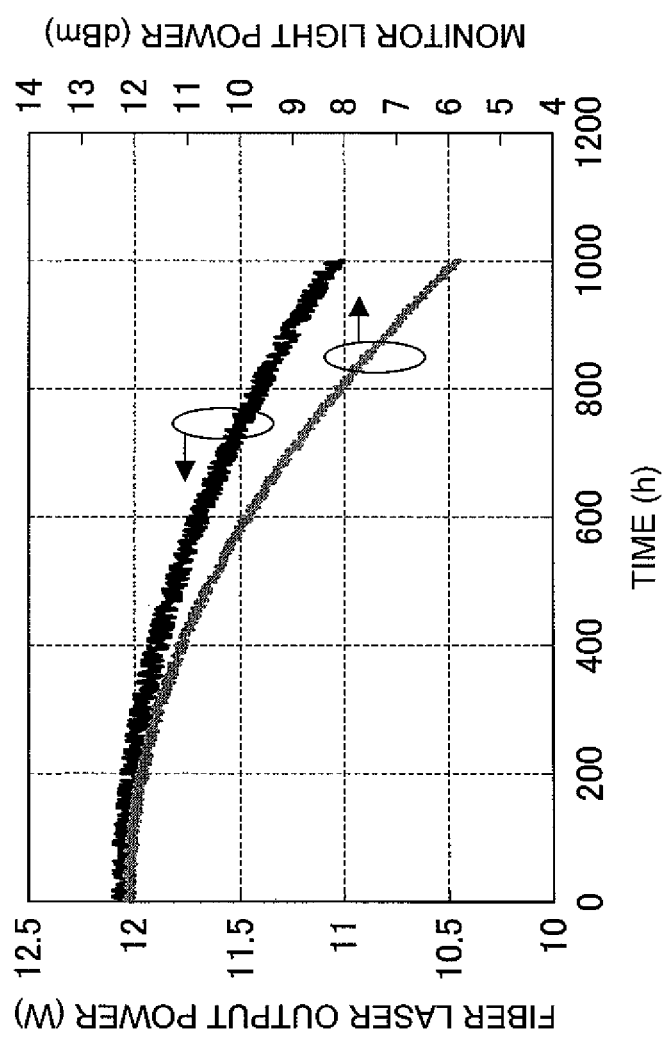
FIG. 6 illustrates a relation between temporal changes in light intensity of a fiber laser light and monitoring light after the monitoring light passes through the rare-earth doped optical fiber in Example 1.

As illustrated in FIG. 6, the temporal changes of the increases in losses of the monitoring light and fiber laser light have a constant relation to each other, so that the increase in loss of the fiber laser light can be predicted from the increase in loss of the monitoring light. The monitoring light is larger than the fiber laser light in the amount of change of the decrease in output, so that the increase in loss of the fiber laser light can correctly be estimated. Therefore, when the light intensity of the monitoring light detected by the passing light detector 5 decreases, the output intensity of the fiber laser light can be kept constant by increasing the driving current of the excitation light source 7. Because the increase in loss of the rare-earth doped optical fiber 1 is measured using another light source without partially taking out the fiber laser light, advantageously the output intensity of the fiber laser light does not decrease.

At this point, the wavelength of the monitoring light is shorter than that of the excitation light source 7. For example, when the excitation light has the wavelength of 808 nm, the monitoring light has the wavelength lower than 808 nm, so that the increase in loss caused by the photodarkening can be measured. Additionally the wavelength of the monitoring light does not overlap the laser oscillation wavelength near 1064 nm, so that the wavelengths of the monitoring light and laser light can easily be separated from each other.

Preferably the wavelength of the monitoring light is shorter than an absorption wavelength band of the rare-earth element. When the wavelength of the monitoring light is set to the range of 850 nm to 1050 nm while Yb is used as the rare-earth element, the correct increase in loss caused by the photodarkening is difficult to measure because the rare-earth doped optical fiber 1 absorbs the monitoring light. Therefore, the increase in loss caused by the photodarkening can correctly be measured in the rare-earth doped optical fiber 1 by monitoring the light on the side of the wavelength shorter than the laser oscillation wavelength.

Preferably the wavelength of the monitoring light is 600 nm or more. Because the increase in loss caused by the photodarkening has a strong influence on the light having the wavelength lower than 600 nm, there is a risk of narrowing a time range in which the increase in loss can correctly be measured.

Accordingly, preferably the wavelength of the monitoring light is shorter than the absorption wavelength band of the rare-earth element and not lower than 600 nm. For example, when Yb is used as the rare-earth element, preferably the wavelength of the monitoring light ranges from 600 nm to 850 nm.

In the first embodiment, while the rare-earth doped optical fiber 1 is interposed between the optical multiplexer 3 and the optical demultiplexer 4, the monitoring light source 2 and the optical multiplexer 3 are disposed on the side of the excitation light source 7, and the passing light detector 5 and the optical demultiplexer 4 are disposed on the fiber laser output side. However, the invention is not limited to the configuration of the first embodiment. For example, the passing light detector 5 and the optical demultiplexer 4 may be disposed on the side of the excitation light source 7 while the monitoring light source 2 and the optical multiplexer 3 are disposed on the fiber laser output side.

Figure 2:
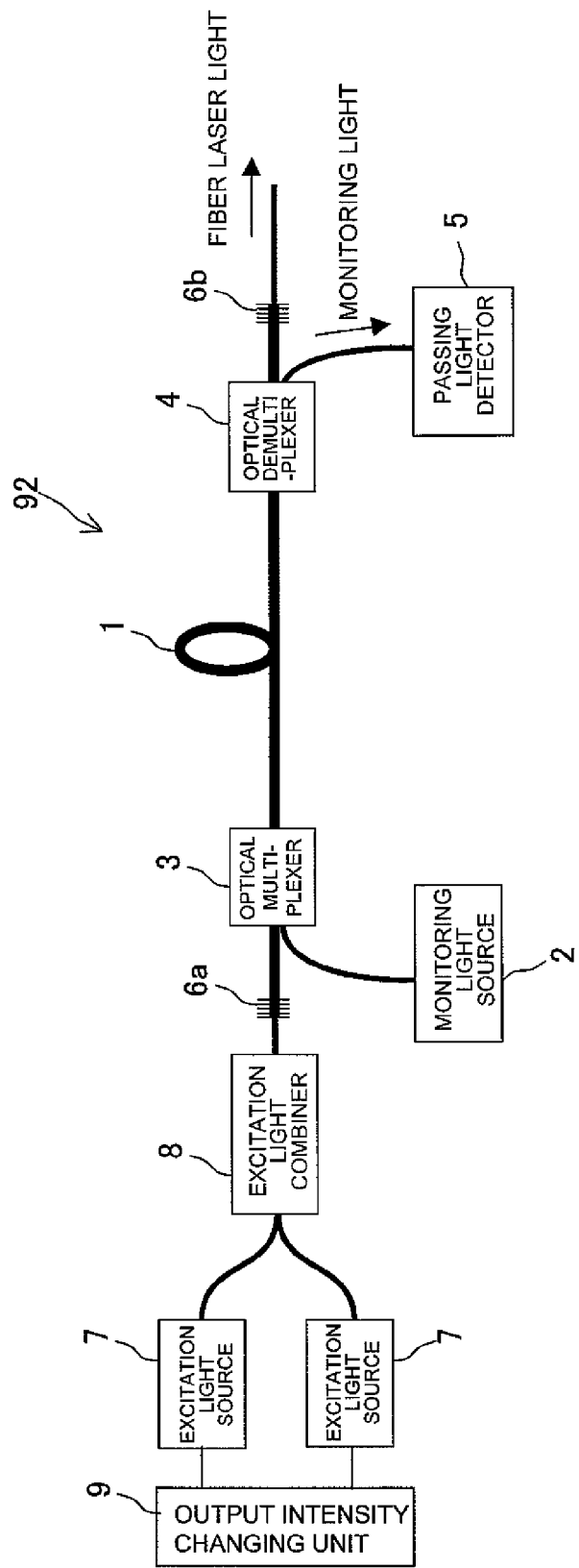
FIG. 2 illustrates a modification of the fiber output stabilizer of the first embodiment.

FIG. 2 illustrates a modification of the fiber output stabilizer of the first embodiment. In a fiber output stabilizer 92 of the modification, the optical multiplexer 3 and the optical demultiplexer 4 are disposed in the way of the optical path between the one set of reflecting mirrors 6a and 6b. Other configurations are similar to those of the fiber output stabilizer 91 of FIG. 1. In the configuration of the fiber output stabilizer 92, the loss of the monitoring light is eliminated in the reflecting mirrors 6a and 6b, so that the increase in loss caused by the photodarkening can accurately be measured to accurately stabilize the fiber laser output.

Second Embodiment

Figure 3:
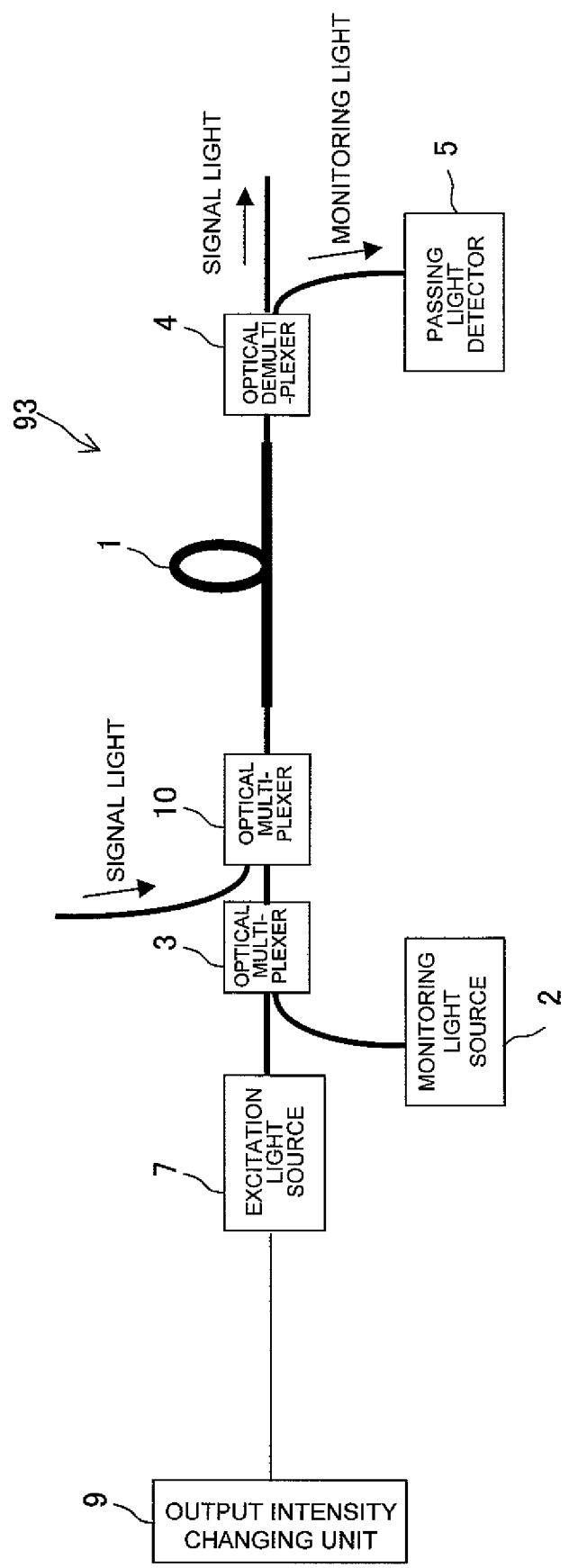
FIG. 3 is a schematic diagram illustrating a configuration of a fiber output stabilizer according to a second embodiment of the invention.

FIG. 3 is a schematic diagram illustrating a configuration of a fiber output stabilizer according to a second embodiment of the invention. A fiber output stabilizer 93 of the second embodiment is a configuration example when the rare-earth doped optical fiber 1 is used as the optical fiber amplifier. Specifically, the fiber output stabilizer 93 includes the rare-earth doped optical fiber 1, the monitoring light source 2, the optical multiplexer 3, the optical demultiplexer 4, the passing light detector 5, and the optical multiplexer 10 and stabilizes the output light from the rare-earth doped optical fiber 1.

In the second embodiment, an optical multiplexer 10 is provided because the rare-earth doped optical fiber 1 is used as the optical fiber amplifier. Preferably the optical multiplexer 10 is a wavelength multiplexer such as the excitation light combiner that multiplexes the signal light without loss and which wavelength is different from the excitation light The excitation light source 7 emits the excitation light that excites the rare-earth element added to the rare-earth doped optical fiber 1. The excitation light impinges on the rare-earth doped optical fiber 1 through the optical multiplexer 3 and the optical multiplexer 10. The optical multiplexer 10 multiplexes the signal light into the excitation light, and the multiplexed light passes through the rare-earth doped optical fiber 1. At this point, the signal light is amplified. Other configurations are similar to those of the fiber output stabilizer 91 of FIG. 1.

In the second embodiment, the optical multiplexer 10 is disposed on the optical fiber that connects the optical multiplexer 3 and the optical demultiplexer 4. However, the invention is not limited to the configuration of the second embodiment. The optical multiplexer 3 may be disposed on the optical fiber that connects the optical multiplexer 10 and the optical demultiplexer 4, or the optical multiplexer 10 and the optical multiplexer 3 may be formed into a common optical component.

Third Embodiment

Figure 4:
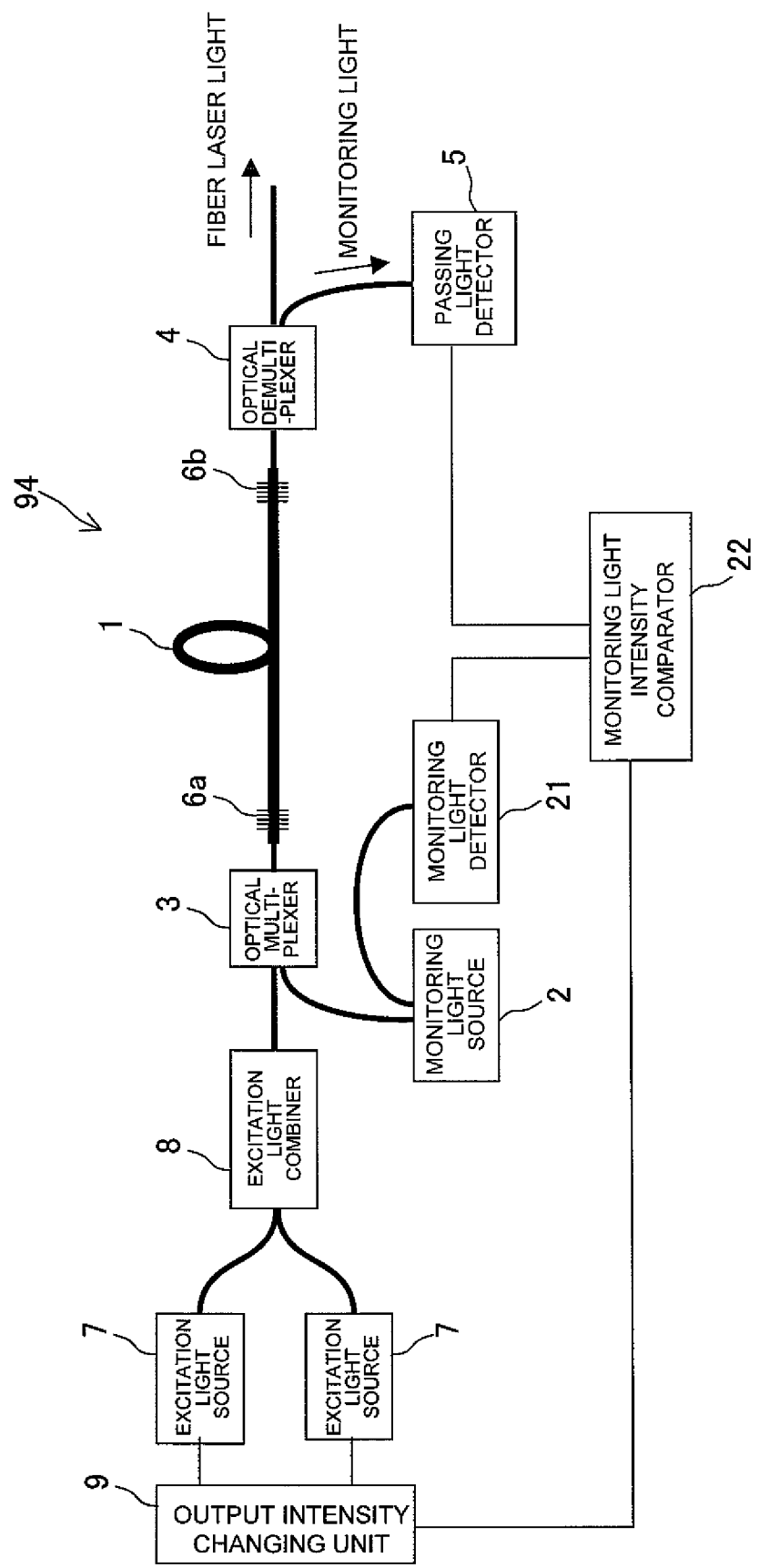
FIG. 4 is a schematic diagram illustrating a configuration of a fiber output stabilizer according to a third embodiment of the invention.

FIG. 4 is a schematic diagram illustrating a configuration of a fiber output stabilizer according to a third embodiment of the invention. In addition to the fiber output stabilizer of the first and second embodiments, a fiber output stabilizer 94 of the third embodiment further includes a monitoring light detector 21 and a monitoring light intensity comparator 22. The third embodiment will be described using the first embodiment of the first and second embodiments by way of example.

The monitoring light detector 21 detects the light intensity of the monitoring light emitted from the monitoring light source 2. The monitoring light intensity comparator 22 detects a difference between the light intensity detected by the passing light detector 5 and the light intensity detected by the monitoring light detector 21, so that the amount of loss of the monitoring light can be measured in the rare-earth doped optical fiber 1. The output intensity changing unit 9 changes the output intensity of the excitation light source 7 to the output intensity that is previously determined according to the difference detected by the monitoring light intensity comparator 22. For example, when the semiconductor laser is used as the excitation light source 7, the output intensity changing unit 9 drives the semiconductor laser with the driving current that is previously determined according to the difference detected by the monitoring light intensity comparator 22.

The temporal changes of the increases in loss of the monitoring light and fiber laser light, that is, transmittance of the monitoring light and the decrease in output of the rare-earth doped optical fiber 1 have a constant relation to each other. A relation between the transmittance of the monitoring light obtained from the difference detected by the monitoring light intensity comparator 22 and the decrease in output of the rare-earth doped optical fiber 1 is previously measured, and the amount of change in output intensity of the light intensity of the excitation light source 7 according to the transmittance of the monitoring light is stored in the output intensity changing unit 9. The output intensity changing unit 9 increases the light intensity of the excitation light emitted from the excitation light source 7 by the amount of change in output intensity according to the transmittance of the monitoring light obtained from the difference detected by the monitoring light intensity comparator 22. Therefore, the output intensity of the fiber laser light output from the rare-earth doped optical fiber 1 can be kept constant.

In the third embodiment, because the light intensity difference of the monitoring light is directly measured before and after the monitoring light impinges on the rare-earth doped optical fiber 1, an output fluctuation of the monitoring light has no influence on the fiber laser light. Therefore, the change of the increase in loss caused by the photodarkening can correctly be measured in the rare-earth doped optical fiber 1 to accurately maintain the regular output light intensity of the fiber laser light.

Fourth Embodiment

Figure 5:
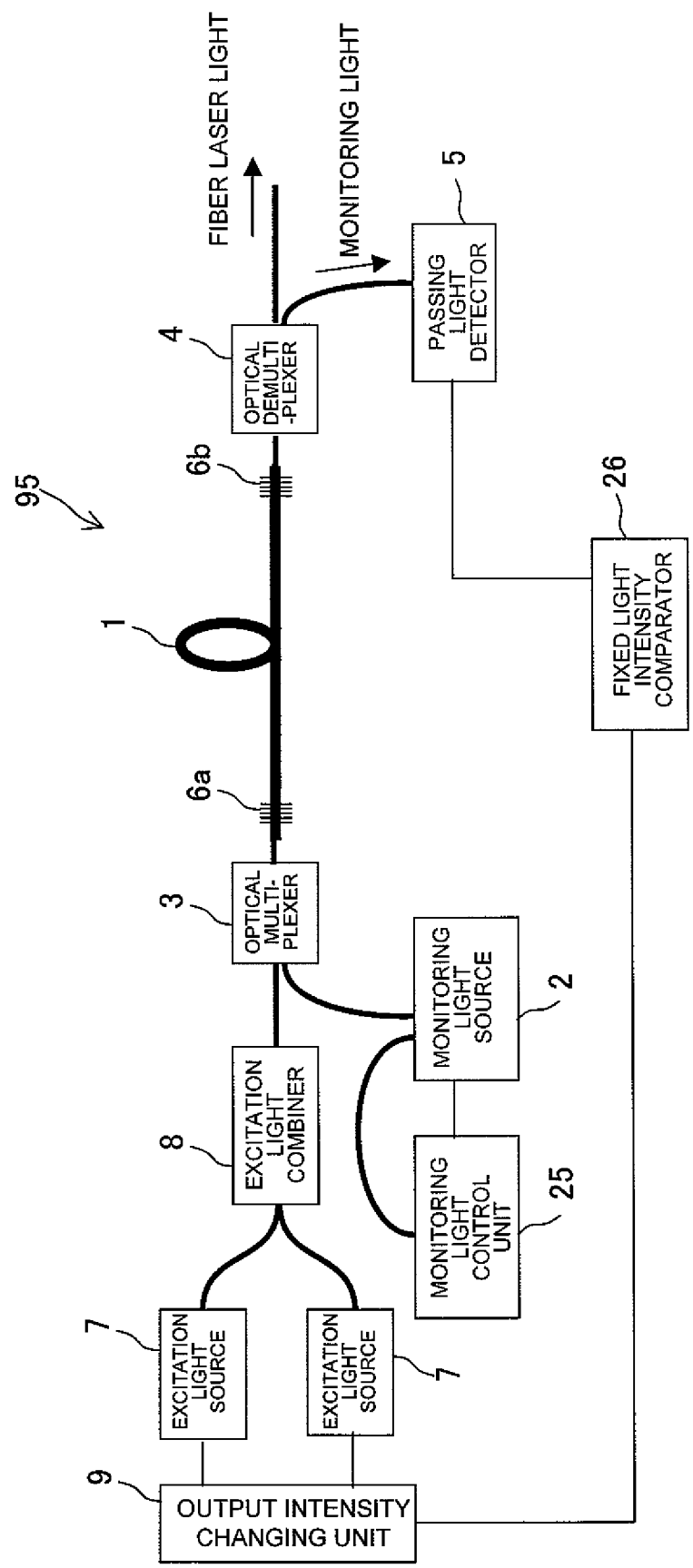
FIG. 5 is a schematic diagram illustrating a configuration of a fiber output stabilizer according to a fourth embodiment of the invention.

FIG. 5 is a schematic diagram illustrating a configuration of a fiber output stabilizer according to a fourth embodiment of the invention. In addition to the fiber output stabilizer of the first to third embodiments, a fiber output stabilizer 95 of the fourth embodiment further includes a monitoring light control unit 25 and a fixed light intensity comparator 26. The fourth embodiment will be described using the first embodiment of the first to third embodiments by way of example.

The monitoring light control unit 25 maintains the regular light intensity of the monitoring light emitted from the monitoring light source 2. For example, the light intensity of the monitoring light is kept constant using a light output stabilizing function built into the monitoring light source 2. The fixed light intensity comparator 26 previously stores the predetermined reference light intensity therein, detects the difference between the reference light intensity and the light intensity detected by the passing light detector 5, and measures the decrease in light intensity of the monitoring light. At this point, for example, the reference light intensity is the light intensity of the monitoring light detected by the passing light detector 5 when the photodarkening is not generated in the rare-earth doped optical fiber 1. The output intensity changing unit 9 changes the light intensity of the excitation light source 7 to the output intensity that is previously determined according to the difference detected by the fixed light intensity comparator 26. For example, when the semiconductor laser is used as the excitation light source 7, the output intensity changing unit 9 drives the semiconductor laser with the driving current that is previously determined according to the difference detected by the fixed light intensity comparator 26. Therefore, the output intensity of the fiber laser light output from the rare-earth doped optical fiber 1 can be kept constant. The function and operation of the output intensity changing unit 9 are similar to those of the third embodiment.

In the fourth embodiment, the control is performed such that the light intensity of the monitoring light is kept constant, so that the change of the increase in loss caused by the photodarkening can stably be measured in the rare-earth doped optical fiber 1. Therefore, the output light intensity of the fiber laser light can stably be kept constant. Additionally, a constant value is used as the reference light intensity compared by the fixed light intensity comparator 26, so that the circuit configuration of the fixed light intensity comparator 26 can be simplified.

Fifth Embodiment

Figure 9:
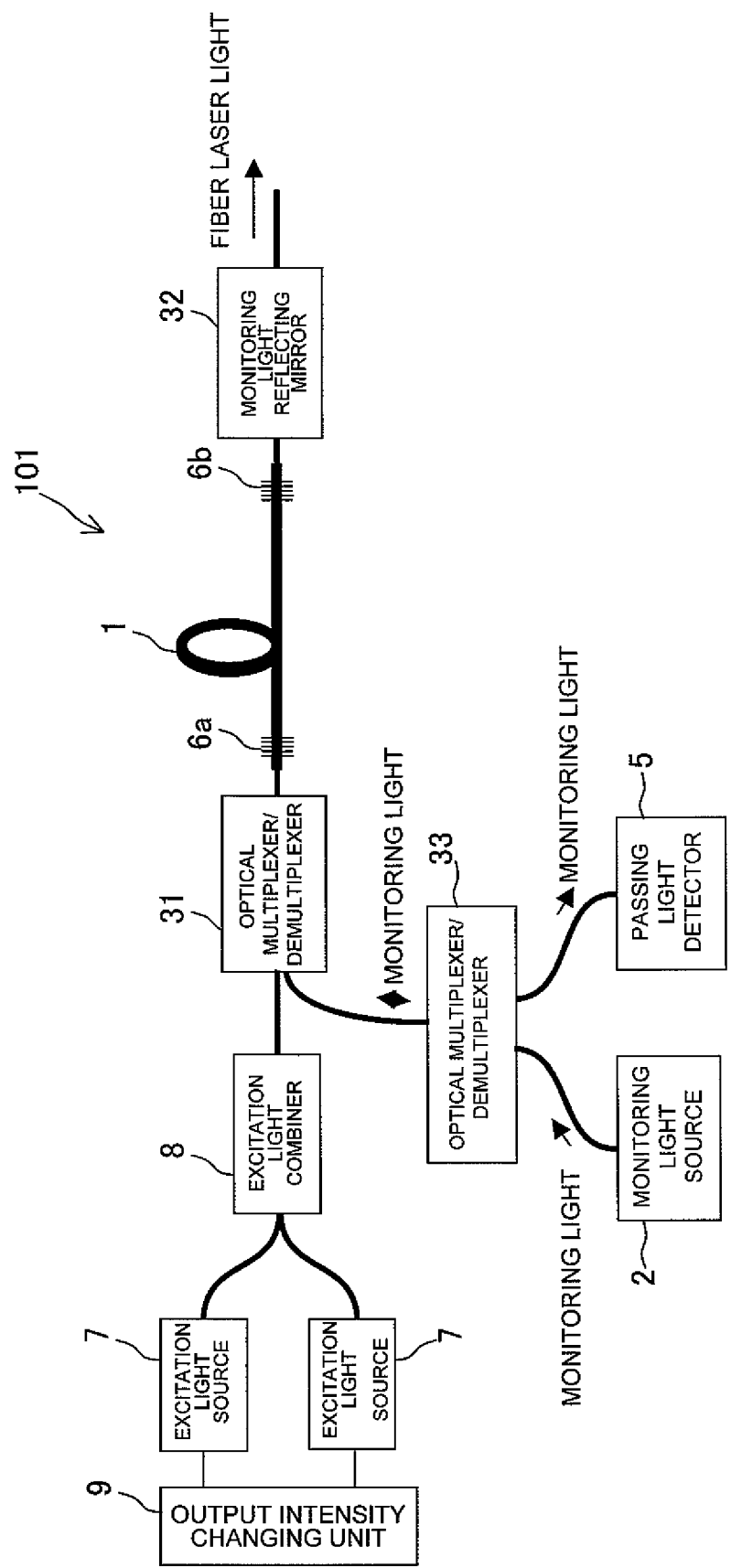
FIG. 9 is a schematic diagram illustrating a configuration of a fiber output stabilizer according to a fifth embodiment of the invention.

FIG. 9 is a schematic diagram illustrating a configuration of a fiber output stabilizer according to a fifth embodiment of the invention. A fiber output stabilizer 101 of the fifth embodiment includes an optical multiplexer/demultiplexer 31 and a monitoring light reflecting mirror 32 instead of the optical multiplexer 3 and optical demultiplexer 4 of FIG. 1.

Specifically, the fiber output stabilizer 101 includes the rare-earth doped optical fiber 1, the excitation light source 7, the excitation light combiner 8, and the reflecting mirrors 6a and 6b and uses the rare-earth doped optical fiber 1 as the fiber laser. The functions and operations of the rare-earth doped optical fiber 1, excitation light source 7, excitation light combiner 8, and reflecting mirrors 6a and 6b are similar to those of the first embodiment.

The fiber output stabilizer 101 also includes the monitoring light source 2, an optical multiplexer/demultiplexer 31, a monitoring light reflecting mirror 32, an optical multiplexer/demultiplexer 33, the passing light detector 5, and the output intensity changing unit 9 and stabilizes the output light from the rare-earth doped optical fiber 1, that is, the light intensity of the fiber laser light.

The monitoring light source 2 emits the monitoring light having the wavelength shorter than that of the excitation light emitted from the excitation light source 7. The optical multiplexer/demultiplexer 33 outputs the monitoring light emitted from the monitoring light source 2 to the optical multiplexer/demultiplexer 31. The optical multiplexer/demultiplexer 31 multiplexes the monitoring light emitted from the monitoring light source 2 on the excitation light. For example, the optical multiplexer/demultiplexer 31 is a WDM (Wavelength Division Multiplexing) coupler. The monitoring light reflecting mirror 32 reflects the monitoring light passing through the rare-earth doped optical fiber 1 toward the optical multiplexer/demultiplexer 31. The optical multiplexer/demultiplexer 31 demultiplexes the monitoring light reflected from the rare-earth doped optical fiber 1. The optical multiplexer/demultiplexer 33 outputs the monitoring light of the optical multiplexer/demultiplexer 31 to the passing light detector 5. The passing light detector 5 detects the light intensity of the monitoring light from the optical demultiplexer 31.

At this point, the monitoring light reflecting mirror 32 transmits the fiber laser light while reflecting the monitoring light. For example, the monitoring light reflecting mirror 32 selectively transmits the light having the wavelength of the fiber laser light while reflecting the pieces of light having other wavelengths.

The one set of reflecting mirrors 6a and 6b is disposed in the way of the optical path between the optical multiplexer/demultiplexer 31 and the monitoring light reflecting mirror 32. Therefore, influences of the losses in the optical multiplexer/demultiplexer 31 and monitoring light reflecting mirror 32 of the laser microcavity can be avoided.

The fiber output stabilizer 101 has the above-described configuration, so that the output intensity changing unit 9 can perform the control such that the output state from the fiber laser is kept constant similarly to the fiber output stabilizer 91 of the first embodiment.

In the fiber output stabilizer 101, the monitoring light can be detected without demultiplexing the light amplified by the rare-earth doped optical fiber 1. Therefore, optical component damage caused by the high-power light can be prevented without loss of the light intensity in the optical component. Additionally, a disconnection state of the optical fiber can be detected between the optical multiplexer/demultiplexer 31 and the monitoring light reflecting mirror 32.

In the fifth embodiment, while the rare-earth doped optical fiber 1 is interposed between the optical multiplexer/demultiplexer 31 and the monitoring light reflecting mirror 32, the optical multiplexer/demultiplexer 31 is disposed on the side of the excitation light source 7, and the monitoring light reflecting mirror 32 is disposed on the fiber laser output side. However, the invention is not limited to the configuration of the fifth embodiment. For example, the monitoring light reflecting mirror 32 may be disposed on the side of the excitation light source 7 while the optical multiplexer/demultiplexer 31 may be disposed on the fiber laser output side.

Figure 10:
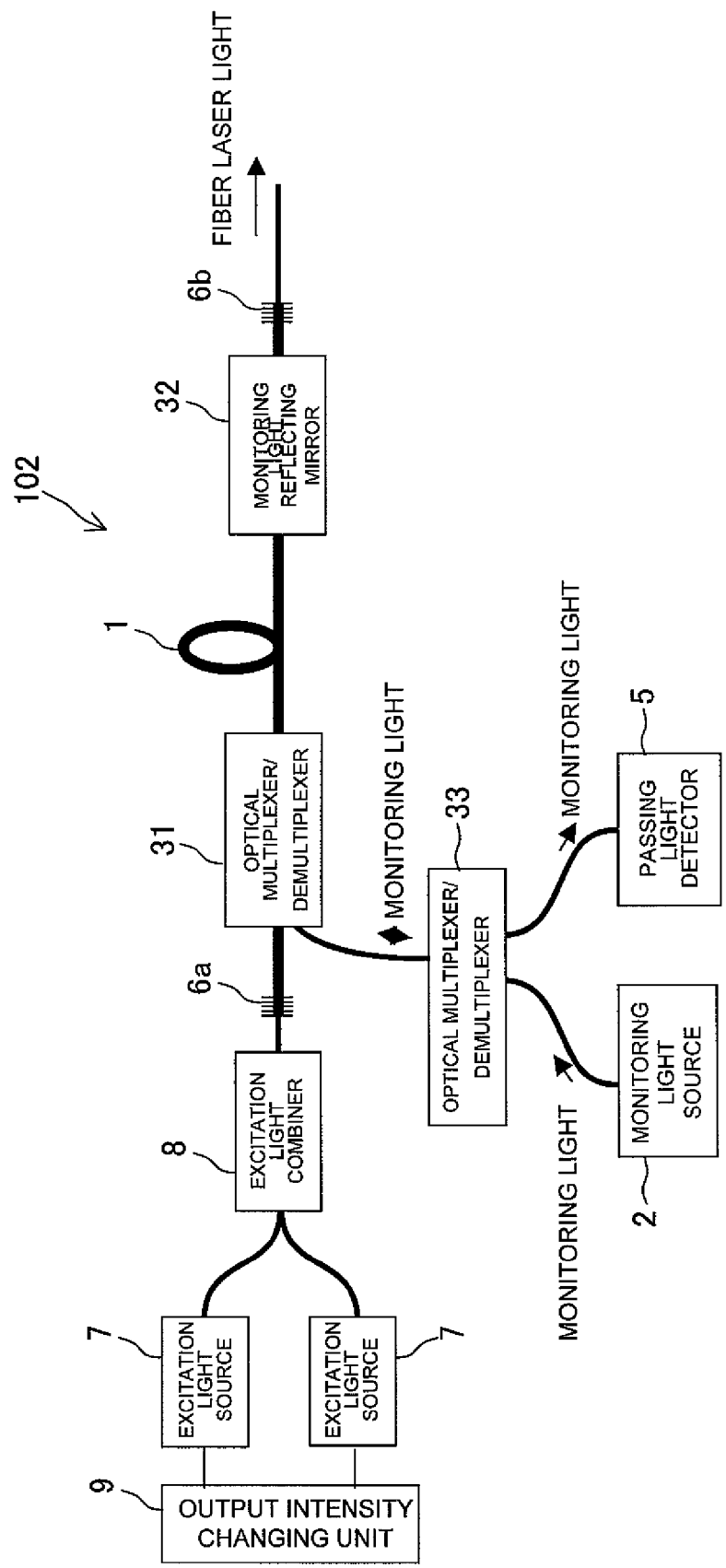
FIG. 10 illustrates a modification of the fiber output stabilizer of the fifth embodiment.

FIG. 10 illustrates a modification of the fiber output stabilizer of the fifth embodiment. In a fiber output stabilizer 102 of the modification, the optical multiplexer/demultiplexer 31 and the monitoring light reflecting mirror 32 are disposed in the way of the optical path between the one set of reflecting mirrors 6a and 6b. Other configurations are similar to those of the fiber output stabilizer 101 of FIG. 9. In the configuration of the fiber output stabilizer 102, the loss of the monitoring light is eliminated in the reflecting mirrors 6a and 6b, so that the increase in loss caused by the photodarkening can accurately be measured to accurately stabilize the fiber laser output.

Sixth Embodiment

Figure 11:
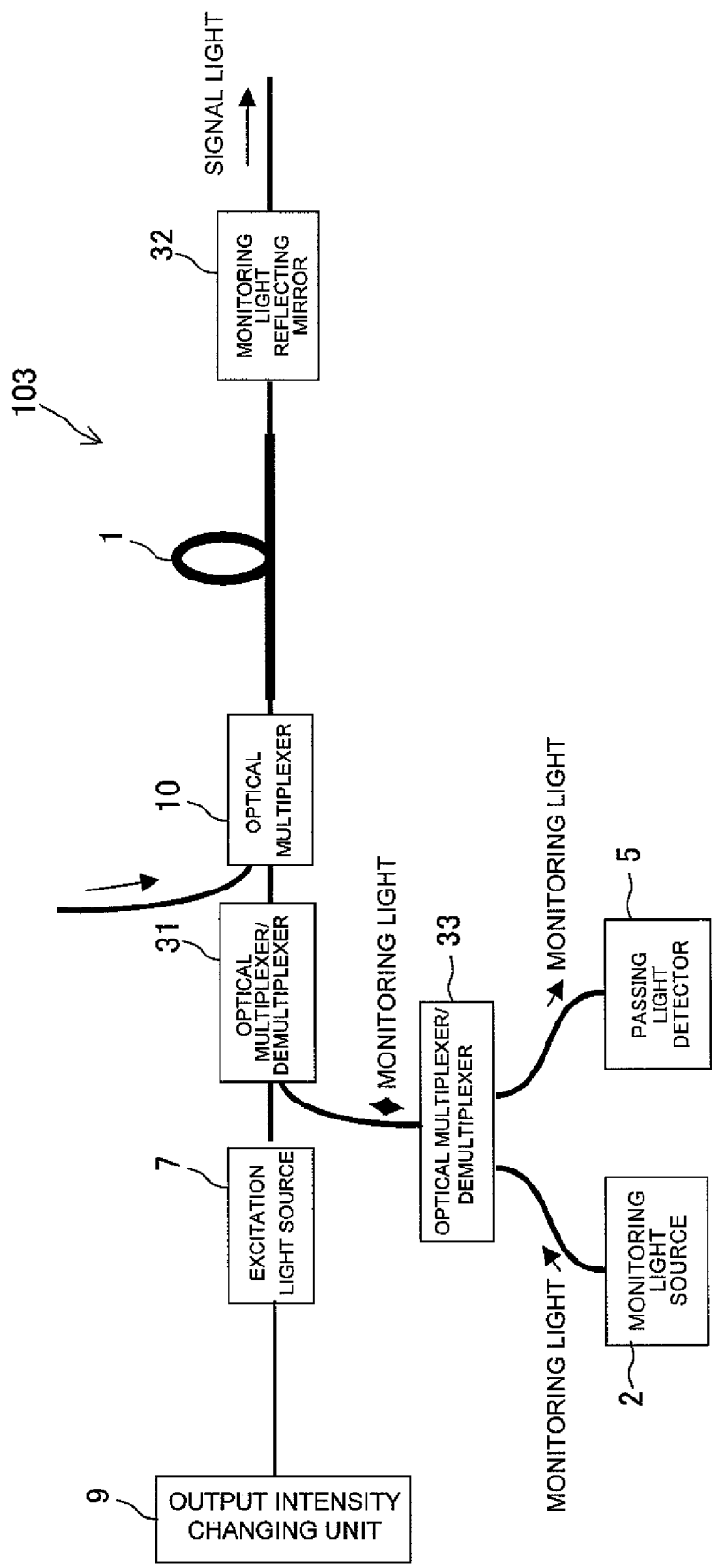
FIG. 11 is a schematic diagram illustrating a configuration of a fiber output stabilizer according to a sixth embodiment of the invention.

FIG. 11 is a schematic diagram illustrating a configuration of a fiber output stabilizer according to a sixth embodiment of the invention. A fiber output stabilizer 103 of the sixth embodiment includes the optical multiplexer/demultiplexer 31 and the monitoring light reflecting mirror 32 instead of the optical multiplexer 3 and optical demultiplexer 4 of FIG. 3.

Specifically, the fiber output stabilizer 103 includes the rare-earth doped optical fiber 1, the excitation light source 7, and the optical multiplexer 10 and uses the rare-earth doped optical fiber 1 as the optical fiber amplifier. The functions and operations of the rare-earth doped optical fiber 1, excitation light source 7, and optical multiplexer 10 are similar to those of the second embodiment.

The fiber output stabilizer 103 includes the monitoring light source 2, the optical multiplexer/demultiplexer 31, the monitoring light reflecting mirror 32, the optical multiplexer/demultiplexer 33, the passing light detector 5, and the output intensity changing unit 9 and stabilizes the output light from the rare-earth doped optical fiber 1, that is, the light intensity of the signal light. The functions and operations of the monitoring light source 2, optical multiplexer/demultiplexer 31, monitoring light reflecting mirror 32, optical multiplexer/demultiplexer 33, passing light detector 5, and output intensity changing unit 9 are similar to those of the fifth embodiment.

The excitation light source 7 emits the excitation light that excites the rare-earth element added to the rare-earth doped optical fiber 1. The excitation light impinges on the rare-earth doped optical fiber 1 through the optical multiplexer/demultiplexer 31 and the optical multiplexer 10. The optical multiplexer 10 multiplexes the signal light with the excitation light, and the multiplexed light passes through the rare-earth doped optical fiber 1. At this point, the signal light is amplified.

The monitoring light reflecting mirror 32 transmits the signal light included in the multiplexed light while reflecting the monitoring light. For example, the monitoring light reflecting mirror 32 selectively transmits the light having the wavelength of the signal light while reflecting pieces of light having other wavelengths.

In the sixth embodiment, the optical multiplexer 10 is disposed on the optical fiber that connects the optical multiplexer/demultiplexer 31 and the monitoring light reflecting mirror 32. However, the invention is not limited to the configuration of the sixth embodiment. Alternatively, the optical multiplexer/demultiplexer 31 may be disposed on the optical fiber that connects the optical multiplexer 10 and the monitoring light reflecting mirror 32, or the optical multiplexer 10 and the optical multiplexer/demultiplexer 31 may be formed into a common optical component.

Seventh Embodiment

Figure 12:
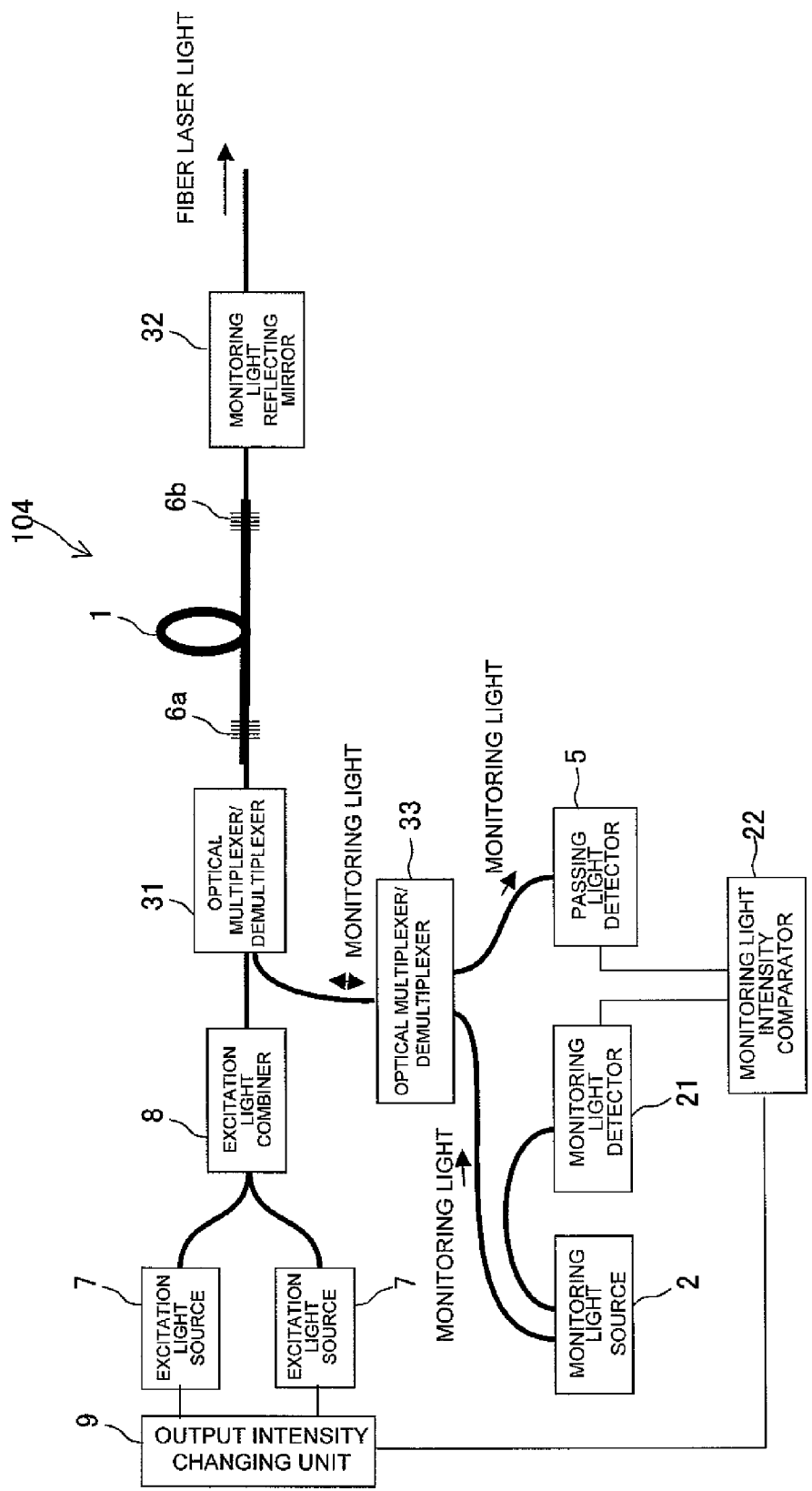
FIG. 12 is a schematic diagram illustrating a configuration of a fiber output stabilizer according to a seventh embodiment of the invention.

FIG. 12 is a schematic diagram illustrating a configuration of a fiber output stabilizer according to a seventh embodiment of the invention. A fiber output stabilizer 104 of the seventh embodiment includes the optical multiplexer/demultiplexer 31 and the monitoring light reflecting mirror 32 instead of the optical multiplexer 3 and optical demultiplexer 4 of FIG. 4. That is, the fiber output stabilizer 104 further includes the monitoring light detector 21 and the monitoring light intensity comparator 22 in addition to the fiber output stabilizer of the fifth and sixth embodiments.

Specifically, the fiber output stabilizer 104 includes the rare-earth doped optical fiber 1, the excitation light source 7, the excitation light combiner 8, and the reflecting mirrors 6a and 6b and uses the rare-earth doped optical fiber 1 as the fiber laser. The functions and operations of the rare-earth doped optical fiber 1, excitation light source 7, excitation light combiner 8, and reflecting mirrors 6a and 6b are similar to those of the first embodiment.

The fiber output stabilizer 104 also includes the monitoring light source 2, the optical multiplexer/demultiplexer 31, the monitoring light reflecting mirror 32, the optical multiplexer/demultiplexer 33, the passing light detector 5, the output intensity changing unit 9, the monitoring light detector 21, and the monitoring light intensity comparator 22 and stabilizes the output light from the rare-earth doped optical fiber 1, that is, the light intensity of the fiber laser light. The functions and operations of the monitoring light source 2, optical multiplexer/demultiplexer 31, monitoring light reflecting mirror 32, optical multiplexer/demultiplexer 33, passing light detector 5, and output intensity changing unit 9 are similar to those of the fifth embodiment. The functions and operations of the monitoring light detector 21 and monitoring light intensity comparator 22 are similar to those of the third embodiment.

In the seventh embodiment, because the light intensity difference of the monitoring light is directly measured before and after the monitoring light impinges on the rare-earth doped optical fiber 1, the output fluctuation of the monitoring light and so on have no influence on the fiber laser light. Therefore, the change of the increase in loss caused by the photodarkening can correctly be measured in the rare-earth doped optical fiber 1 to accurately maintain the regular output light intensity of the fiber laser light.

In the fiber output stabilizer 104, the monitoring light can be detected without demultiplexing the light amplified by the rare-earth doped optical fiber 1. Therefore there is no loss of the light intensity in the optical component and the optical component damage caused by the high-power light can be prevented. Additionally, the disconnection state of the optical fiber can be detected between the optical multiplexer/demultiplexer 31 and the monitoring light reflecting mirror 32.

Eighth Embodiment

Figure 13:
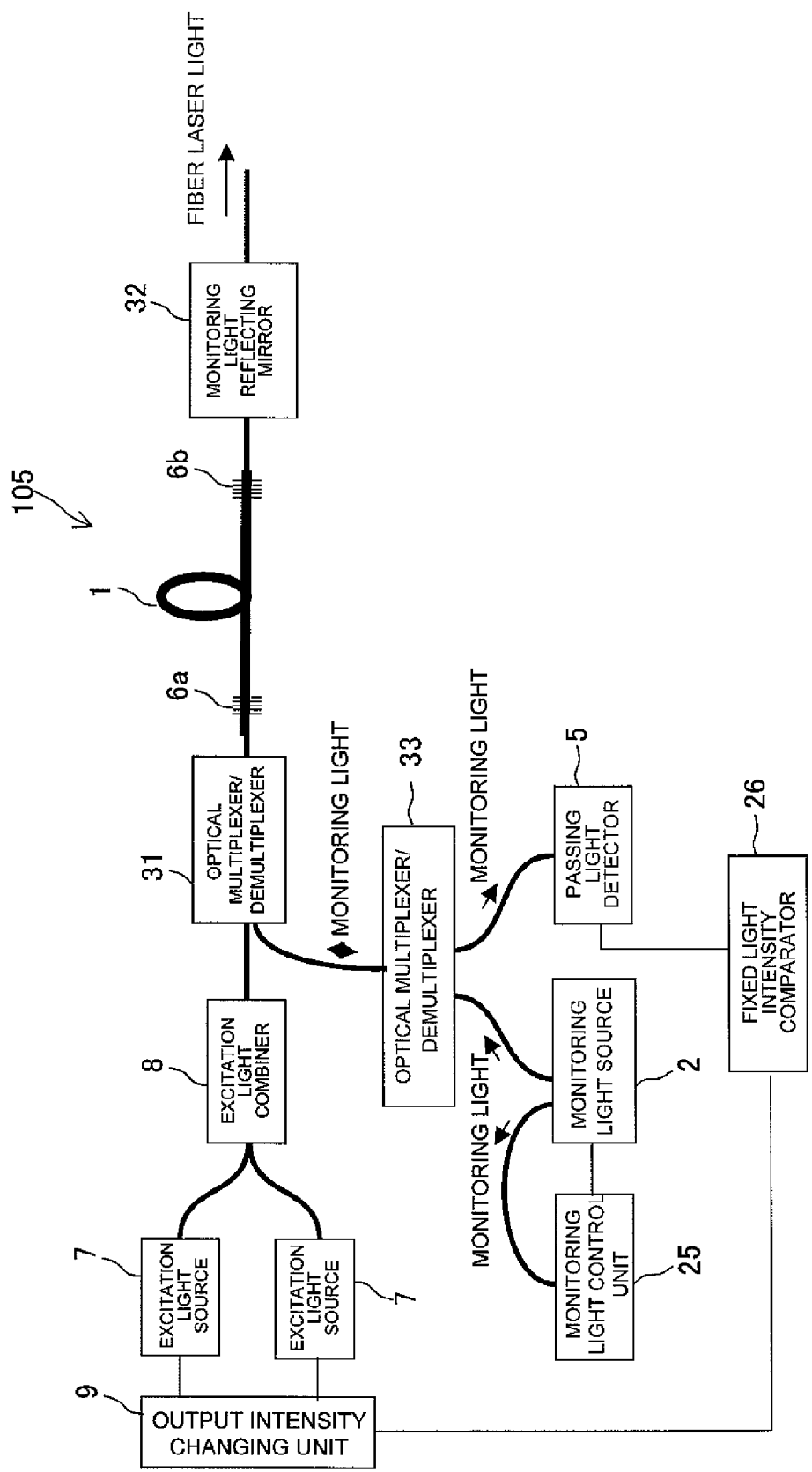
FIG. 13 is a schematic diagram illustrating a configuration of a fiber output stabilizer according to an eighth embodiment of the invention.

FIG. 13 is a schematic diagram illustrating a configuration of a fiber output stabilizer according to an eighth embodiment of the invention. A fiber output stabilizer 105 of the eighth embodiment includes the optical multiplexer/demultiplexer 31 and the monitoring light reflecting mirror 32 instead of the optical multiplexer 3 and optical demultiplexer 4 of FIG. 5. That is, the fiber output stabilizer 105 includes the monitoring light control unit 25 and the fixed light intensity comparator 26 in addition to the fiber output stabilizer of the fifth and sixth embodiments. The eighth embodiment will be described using the fifth embodiment of the fifth and sixth embodiments by way of example.

Specifically, the fiber output stabilizer 105 includes the rare-earth doped optical fiber 1, the excitation light source 7, the excitation light combiner 8, and the reflecting mirrors 6a and 6b and uses the rare-earth doped optical fiber 1 as the fiber laser. The functions and operations of the rare-earth doped optical fiber 1, excitation light source 7, excitation light combiner 8, and reflecting mirror 6a and 6b are similar to those of the first embodiment.

The fiber output stabilizer 105 also includes the monitoring light source 2, the optical multiplexer/demultiplexer 31, the monitoring light reflecting mirror 32, the optical multiplexer/demultiplexer 33, the passing light detector 5, the output intensity changing unit 9, the monitoring light control unit 25, and the fixed light intensity comparator 26 and stabilizes the output light from the rare-earth doped optical fiber 1, that is, the light intensity of the fiber laser light. The functions and operations of the monitoring light source 2, optical multiplexer/demultiplexer 31, monitoring light reflecting mirror 32, optical multiplexer/demultiplexer 3, passing light detector 5, and output intensity changing unit 9 are similar to those of the fifth embodiment. The functions and operations of the monitoring light control unit 25 and fixed light intensity comparator 26 are similar to those of the fourth embodiment.

In the eighth embodiment, the control is performed such that the light intensity of the monitoring light is kept constant, so that the change of the increase in loss caused by the photodarkening can stably be measured in the rare-earth doped optical fiber 1. Therefore, the output light intensity of the fiber laser light can stably be kept constant. Additionally, a constant value is used as the reference light intensity compared by the fixed light intensity comparator 26, so that the circuit configuration of the fixed light intensity comparator 26 can be simplified.

In the fiber output stabilizer 105, the monitoring light can be detected without demultiplexing the light amplified by the rare-earth doped optical fiber 1. Therefore there is no loss of the light intensity in the optical component and the optical component damage caused by the high-power light can be prevented. Additionally, the disconnection state of the optical fiber can be detected between the optical multiplexer/demultiplexer 31 and the monitoring light reflecting mirror 32.

Ninth Embodiment

Figure 14:
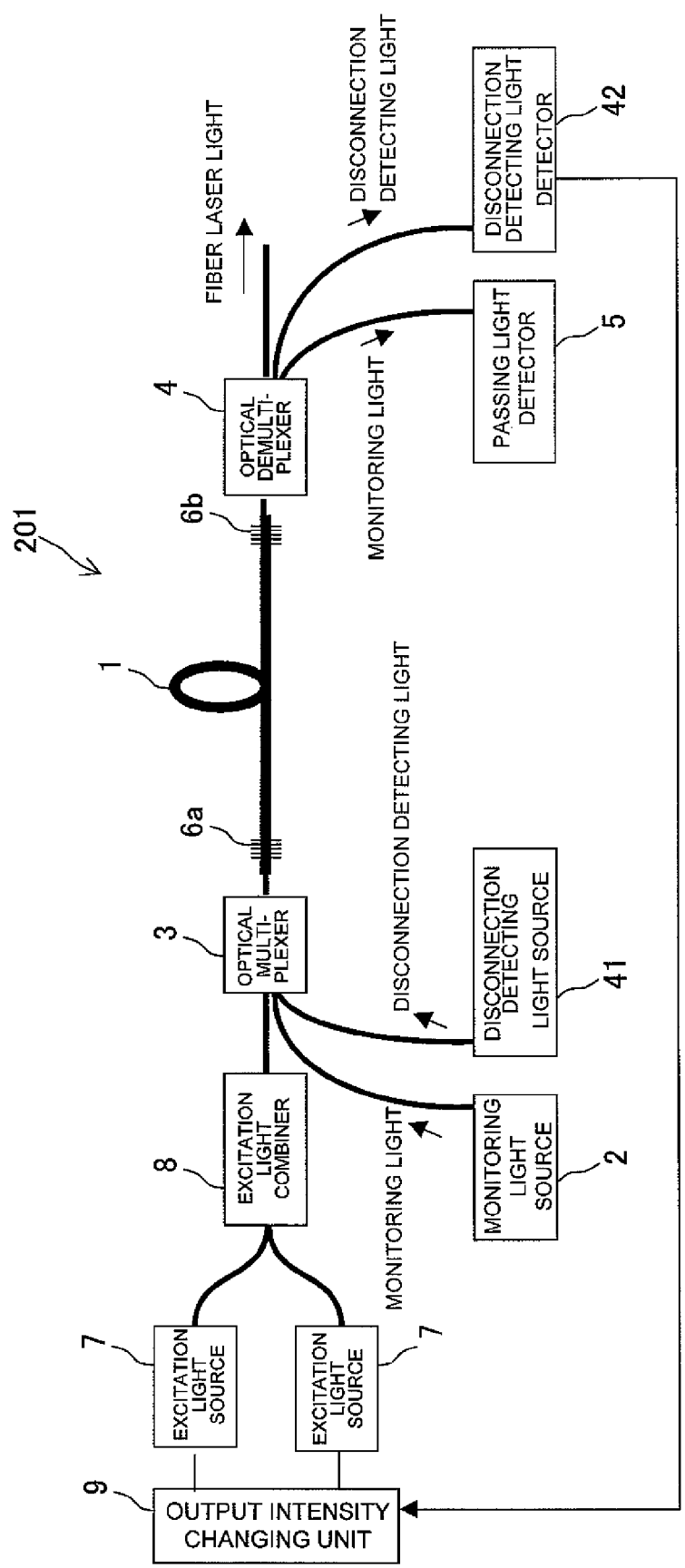
FIG. 14 is a schematic diagram illustrating a configuration of a fiber output stabilizer according to a ninth embodiment of the invention.

FIG. 14 is a schematic diagram illustrating a configuration of a fiber output stabilizer according to a ninth embodiment of the invention. A fiber output stabilizer 201 of the ninth embodiment further includes a disconnection detecting light source 41 and a disconnection detecting light detector 42 in addition to the fiber output stabilizer of the first to eighth embodiments. The ninth embodiment will be described using the first embodiment by way of example.

Specifically, the fiber output stabilizer 201 includes the rare-earth doped optical fiber 1, the excitation light source 7, the excitation light combiner 8, and the reflecting mirrors 6a and 6b and uses the rare-earth doped optical fiber 1 as the fiber laser. The functions and operations of the rare-earth doped optical fiber 1, excitation light source 7, excitation light combiner 8, and reflecting mirrors 6a and 6b are similar to those of the first embodiment.

The disconnection detecting light source 41 emits disconnection detecting light having a wavelength longer than the absorption wavelength band of the rare-earth element to the rare-earth doped optical fiber 1. The optical multiplexer 3 multiplexes the monitoring light and the disconnection detecting light into the excitation light. The optical demultiplexer 4 demultiplexes the monitoring light and disconnection detecting light, which pass through the rare-earth doped optical fiber 1. The passing light detector 5 detects the light intensity of the monitoring light from the optical demultiplexer 4. The disconnection detecting light detector 42 detects the disconnection detecting light from the optical demultiplexer 4. Therefore, the disconnection detecting light detector 42 detects the disconnection detecting light passing through the rare-earth doped optical fiber 1.

For example, the semiconductor laser that emits the light having the wavelength longer than the absorption wavelength band of the rare-earth element can be used as the disconnection detecting light source 41. For example, an optical power meter that receives the light having the wavelength longer than the absorption wavelength band of the rare-earth element can be used as the disconnection detecting light detector 42. A common optical detector may be used as the passing light detector 5 and the disconnection detecting light detector 42.

Because the disconnection detecting light has the wavelength longer than the absorption wavelength band of the rare-earth element, the disconnection detecting light is not absorbed by the rare-earth doped optical fiber 1 and has no influence by the photodarkening. Therefore, when a trouble is not generated in a propagation pathway of the disconnection detecting light, the light intensity detected by the disconnection detecting light detector 42 does not decrease even if the monitoring light loss caused by the photodarkening becomes large. On the other hand, when the trouble is generated in the propagation pathway of the disconnection detecting light, the light intensity detected by the disconnection detecting light detector 42 decreases even if the monitoring light loss caused by the photodarkening is eliminated. Therefore, the disconnection detecting light detector 42 detects the disconnection detecting light to be able to determine whether the decrease in light intensity of the monitoring light is caused by the photodarkening or the disconnection.

When the trouble is generated in a propagation pathway of the disconnection detecting light, it is undesirable that the excitation light source 7 emit the excitation light to the rare-earth doped optical fiber 1. Therefore, preferably the output intensity changing unit 9 stops the excitation light emitted from the excitation light source 7 when the light intensity of the disconnection detecting light detected by the disconnection detecting light detector 42 is smaller than a predetermined value.

Example 1

The fiber laser output with the fiber output stabilizer 91 of FIG. 1 was evaluated. In Example 1, the optical multiplexer 3 was removed, and the excitation light combiner 8 multiplexed the monitoring light from the monitoring light source 2 into the excitation light. The reflecting mirrors 6a and 6b were disposed at both ends of the rare-earth doped optical fiber 1.

The Yb-doped optical fiber in which Yb is added as the rare-earth element was used as the rare-earth doped optical fiber 1 having the fiber length of 11 m. In the Yb-doped optical fiber, an absorption amount per unit length at the wavelength of 976 nm was 620 dB/m, a fiber loss was 25 dB/km, and a core/clad diameter was 10 μm/130 μm.

High-reflection FBG having a reflection band of 1064.187 nm to 1064.525 nm and an excitation light loss of 0.1 dB was used as the reflecting mirror 6a. Fusion portions at both ends of the reflecting mirror 6a were coated with coating materials, and the excitation light loss was 0.1 dB in the fusion portion. Low-reflection FBG having a center reflection wavelength of 1064.38 nm and the reflectance of 10% was used as the reflecting mirror 6b.

Two high-output semiconductor lasers were used as the excitation light source 7, and each of the high-output semiconductor lasers had the output power of 10 W and the wavelength of 915 nm. The excitation light combiner 8 had the excitation light loss of 0.2 dB. The semiconductor laser having the wavelength of 808 nm was used as the monitoring light source 2. The optical power meter was used as the passing light detector 5. The connection loss between the rare-earth doped optical fiber 1 and the excitation light combiner 8 was 0.44 dB, and the connection loss between the rare-earth doped optical fiber 1 and the optical demultiplexer 4 was 2.42 dB. The output intensity from the excitation light source 7 was set to 20 W, and the output intensity from the monitoring light source was set to 15 dBm.

FIG. 6 illustrates a relation between temporal changes in light intensity of the fiber laser light and the monitoring light after the monitoring light passes through the rare-earth doped optical fiber. As can be seen from FIG. 6, the fiber laser output intensity and the light intensity of the monitoring light have a constant relation to each other. When the light intensity of the monitoring light decreases, the decrease in output of the fiber laser can be estimated from the decrease in light intensity of the monitoring light. The fiber laser output can be kept constant by increasing the driving current of the excitation light source.

Figure 7:
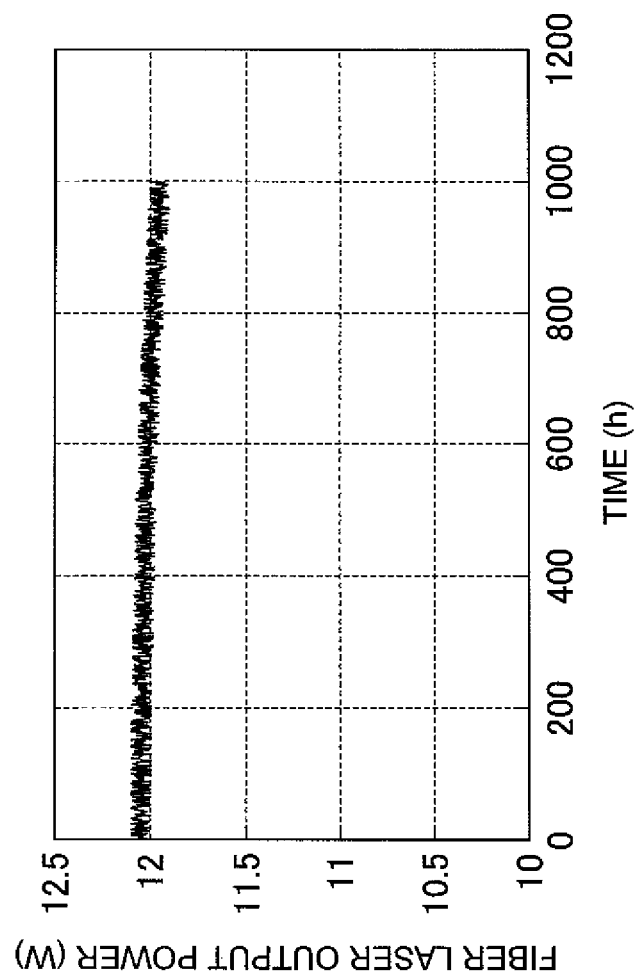
FIG. 7 illustrates fiber laser output when a driving current is controlled from a decrease in output of the monitoring light.

FIG. 7 illustrates the fiber laser output intensity when the driving current is controlled from the decrease in output of the monitoring light. As illustrated in FIG. 7, the decrease in output of the fiber laser output intensity was 0.1 W on an average, and the light intensity of the fiber laser light was able to be substantially kept constant.

Example 2

The fiber laser output with the fiber output stabilizer 92 of the modification of the first embodiment was evaluated. In Example 2, the reflecting mirrors 6a and 6b were disposed at both ends of the rare-earth doped optical fiber 1.

The high-reflection FBG having the reflection band of 1064.915 nm to 1065.236 nm and the excitation light loss of 0.1 dB was used as the reflecting mirror 6a. The fusion portions at both ends of the reflecting mirror 6a were coated with coating materials, and the excitation light loss was 0.1 dB in the fusion portion. The low-reflection FBG having the center reflection wavelength of 1064.71 nm and the reflectance of 10% was used as the reflecting mirror 6b. Other conditions were similar to those of Example 1.

Figure 8:
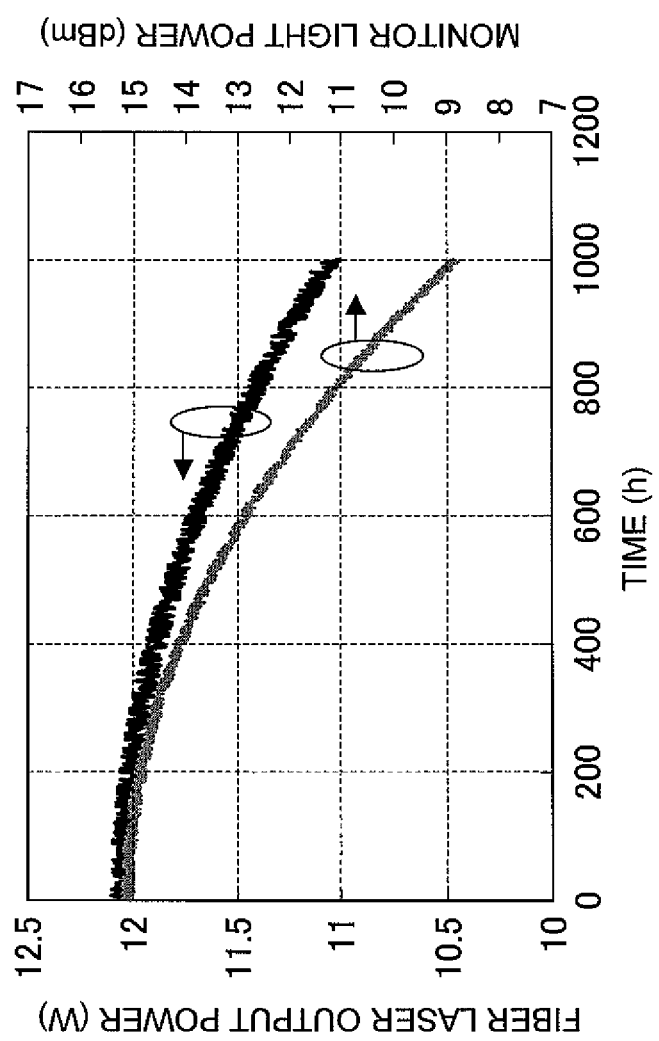
FIG. 8 illustrates a relation between temporal changes in light intensity of a fiber laser light and monitoring light after the monitoring light passes through the rare-earth doped optical fiber in Example 2.

FIG. 8 illustrates a relation between temporal changes in light intensity of the fiber laser light and the monitoring light after the monitoring light passes through the rare-earth doped optical fiber. In Example 2, the fiber laser output intensity and the light intensity of the monitoring light had a constant relation to each other similarly to Example 1. Therefore, in Example 2, the light intensity of the fiber laser light was able to be substantially kept constant similarly to Example 1.

Example 3

The fiber laser output with the fiber output stabilizer 102 of FIG. 10 was evaluated. In Example 3, the monitoring light reflecting mirror 32 was disposed on the fiber laser output side of the reflecting mirror 6b. The reflecting mirrors 6a and 6b were disposed at both ends of the rare-earth doped optical fiber 1.

The Yb-doped optical fiber in which Yb is added as the rare-earth element was used as the rare-earth doped optical fiber 1 having the fiber length of 11 m. In the Yb-doped optical fiber, the absorption amount per unit length at the wavelength of 976 nm was 620 dB/m, the fiber loss was 25 dB/km, and the core/clad diameter was 10 μm/130 μm.

The high-reflection FBG having the reflection band of 1064.187 nm to 1064.525 nm and the excitation light loss of 0.1 dB was used as the reflecting mirror 6a. The fusion portions at both ends of the reflecting mirror 6a were coated with coating materials, and the excitation light loss was 0.1 dB in the fusion portion. The low-reflection FBG having the center reflection wavelength of 1064.38 nm and the reflectance of 10% was used as the reflecting mirror 6b. FBG having a center reflection wavelength of 807.82 nm and the reflectance of 10% was used as the monitoring light reflecting mirror 32.

Two high-output semiconductor lasers were used as the excitation light source 7, and each of the high-output semiconductor lasers had the output power of 10 W and the wavelength of 915 nm. The excitation light combiner 8 had the excitation light loss of 0.2 dB. The semiconductor laser having the wavelength of 808 nm was used as the monitoring light source 2. The optical power meter was used as the passing light detector 5. The fusion loss was 0.05 dB at both ends of the rare-earth doped optical fiber 1, the connection loss between the reflecting mirror 6a and the excitation light combiner 8 was 0.44 dB, and the connection loss between the reflecting mirror 6b and the monitoring light reflecting mirror 32 was 0.05 dB. The output intensity from the excitation light source 7 was set to 20 W, and the output intensity from the monitoring light source was set to 15 dBm.

In Example 3, the light intensity of the fiber laser light was able to be substantially kept constant similarly to Example 1.

Example 4

The fiber laser output with the fiber output stabilizer 201 of FIG. 14 was evaluated. In Example 4, the reflecting mirrors 6a and 6b were disposed at both ends of the rare-earth doped optical fiber 1.

The Yb-doped optical fiber in which Yb is added as the rare-earth element was used as the rare-earth doped optical fiber 1 having the fiber length of 11 m. In the Yb-doped optical fiber, the absorption amount per unit length at the wavelength of 976 nm was 620 dB/m, the fiber loss was 25 dB/km, and the core/clad diameter was 10 μm/130 μm.

The high-reflection FBG having the reflection band of 1064.187 nm to 1064.525 nm and the excitation light loss of 0.1 dB was used as the reflecting mirror 6a. The fusion portions at both ends of the reflecting mirror 6a were coated with coating materials, and the excitation light loss was 0.1 dB in the fusion portion. The low-reflection FBG having the center reflection wavelength of 1064.38 nm and the reflectance of 10% was used as the reflecting mirror 6b.

Two high-output semiconductor lasers were used as the excitation light source 7, and each of the high-output semiconductor lasers had the output power of 10 W and the wavelength of 915 nm. The excitation light combiner 8 has the excitation light loss of 0.2 dB. The semiconductor laser having the wavelength of 808 nm was used as the monitoring light source 2. The semiconductor laser having the wavelength of 1310 nm was used as the disconnection detecting light source 41. The optical power meters were used as the passing light detector 5 and the disconnection detecting light detector 42.

The fusion loss was 0.05 dB at both ends of the rare-earth doped optical fiber 1, the connection loss between the reflecting mirror 6a and the excitation light combiner 8 was 0.44 dB, and the connection loss between the reflecting mirror 6b and the optical demultiplexer 4 was 0.05 dB. The output intensity from the excitation light source 7 was set to 20 W, and the output intensity from each of the monitoring light source 2 and the disconnection detecting light source 41 was set to 15 dBm.

In Example 4, the monitoring light having the wavelength of 808 nm that is largely influenced by the photodarkening and the disconnection detecting light having the wavelength of 1310 nm that is not influenced by the light absorption or photodarkening were used as the monitoring light. Therefore, whether the decrease in output of the fiber laser is caused by the photodarkening or the disconnection of the optical fiber can be checked.

FIG. 15 illustrates an example of detection result of disconnection detecting light. The detection result is expressed in terms of the optical loss (dB) of the disconnection detecting light. When the disconnection was not generated, an optical loss La was low at the wavelength of 1310 nm of the disconnection detecting light. On the other hand, when the disconnection was generated, the optical loss Lb was high at the wavelength of 1310 nm of the disconnection detecting light.

Accordingly, when the increase in loss of the disconnection detecting light having the wavelength of 1310 nm is equal to or lower than a threshold T while the output of the fiber laser light decreases, the determination that the decrease in output of the fiber laser light is caused by the photodarkening can be made. On the other hand, when the increase in loss of the disconnection detecting light having the wavelength of 1310 nm is more than the threshold T while the output of the fiber laser light decreases, the determination that the decrease in output of the fiber laser light is caused by the disconnection can be made.

The present invention can be applied to the fiber laser light source and optical fiber amplifier in which the rare-earth doped optical fiber is used.

What is claimed is:

1. A fiber output stabilizer comprising:
   a rare-earth doped optical fiber in which at least one kind of a rare-earth element is added to a core;
   an excitation light source that supplies excitation light exciting the rare-earth element to the rare-earth doped optical fiber;
   a monitoring light source that emits monitoring light having a wavelength shorter than that of the excitation light source;
   an optical multiplexer that multiplexes the monitoring light emitted from the monitoring light source into the excitation light;
   a passing light detector that detects light intensity of the monitoring light passing through the rare-earth doped optical fiber;
   an output intensity changing unit that changes the output intensity of the excitation light source to light intensity previously determined;
   a monitoring light detector that detects light intensity of the monitoring light emitted from the monitoring light source; and
   a monitoring light intensity comparator that detects a difference between the light intensity detected by the passing light detector and the light intensity detected by the monitoring light detector,
   wherein the output intensity changing unit changes output intensity of the excitation light source to light intensity previously determined according to the difference detected by the monitoring light intensity comparator.

2. The fiber output stabilizer according to claim 1, wherein the wavelength of the monitoring light is shorter than an absorption wavelength band of the rare-earth element.

3. The fiber output stabilizer according to claim 1, wherein Yb is used as the rare-earth element, and
   the wavelength of the monitoring light ranges from 600 nm to 850 nm.

4. A fiber output stabilizer comprising:
   a rare-earth doped optical fiber in which at least one kind of a rare-earth element is added to a core;
   an excitation light source that supplies excitation light exciting the rare-earth element to the rare-earth doped optical fiber;
   a monitoring light source that emits monitoring light having a wavelength shorter than that of the excitation light source;
   an optical multiplexer that multiplexes the monitoring light emitted from the monitoring light source into the excitation light;
   a passing light detector that detects light intensity of the monitoring light passing through the rare-earth doped optical fiber;
   an output intensity changing unit that changes the output intensity of the excitation light source to light intensity previously determined;
   a monitoring light control unit that maintains regular light intensity of the monitoring light emitted from the monitoring light source; and
   a fixed light intensity comparator that detects a difference between the light intensity detected by the passing light detector and predetermined light intensity, wherein the output intensity changing unit changes the output intensity of the excitation light source to light intensity previously determined according to the difference detected by the fixed light intensity comparator.

5. The fiber output stabilizer according to claim 4, wherein the wavelength of the monitoring light is shorter than an absorption wavelength band of the rare-earth element.

6. The fiber output stabilizer according to claim 4, wherein Yb is used as the rare-earth element, and
the wavelength of the monitoring light ranges from 600 nm to 850 nm.

7. A fiber output stabilizer comprising
a rare-earth doped optical fiber in which at least one kind of a rare-earth element is added to a core;
an excitation light source that supplies excitation light exciting the rare-earth element to the rare-earth doped optical fiber;
a monitoring light source that emits monitoring light having a wavelength shorter than that of the excitation light source;
an optical multiplexer that multiplexes the monitoring light emitted from the monitoring light source into the excitation light;
a passing light detector that detects light intensity of the monitoring light passing through the rare-earth doped optical fiber;
an output intensity changing unit that changes the output intensity of the excitation light source to light intensity previously determined; and
one set of reflecting mirrors that is disposed at two points separated from each other in the rare-earth doped optical fiber, reflecting light radiated from the rare-earth element to perform laser oscillation in the rare-earth doped optical fiber.

8. The fiber output stabilizer according to claim 7, wherein the wavelength of the monitoring light is shorter than an absorption wavelength band of the rare-earth element.

9. The fiber output stabilizer according to claim 7, wherein Yb is used as the rare-earth element, and
the wavelength of the monitoring light ranges from 600 nm to 850 nm.

10. A fiber output stabilizer comprising:
a rare-earth doped optical fiber in which at least one kind of a rare-earth element is added to a core;
an excitation light source that supplies excitation light exciting the rare-earth element to the rare-earth doped optical fiber;
a monitoring light source that emits monitoring light having a wavelength shorter than that of the excitation light source;
an optical multiplexer that multiplexes the monitoring light emitted from the monitoring light source into the excitation light;
an optical demultiplexer that demultiplexes the monitoring light passing through the rare-earth doped optical fiber;
a passing light detector that detects light intensity of the monitoring light from the optical demultiplexer;
an output intensity changing unit that changes the output intensity of the excitation light source to light intensity previously determined;
a monitoring light detector that detects light intensity of the monitoring light emitted from the monitoring light source; and
a monitoring light intensity comparator that detects a difference between the light intensity detected by the passing light detector and the light intensity detected by the monitoring light detector,
wherein the output intensity changing unit changes output intensity of the excitation light source to light intensity previously determined according to the difference detected by the monitoring light intensity comparator.

11. The fiber output stabilizer according to claim 10, wherein the wavelength of the monitoring light is shorter than an absorption wavelength band of the rare-earth element.

12. The fiber output stabilizer according to claim 10, wherein Yb is used as the rare-earth element, and
the wavelength of the monitoring light ranges from 600 nm to 850 nm.

13. A fiber output stabilizer comprising:
a rare-earth doped optical fiber in which at least one kind of a rare-earth element is added to a core;
an excitation light source that supplies excitation light exciting the rare-earth element to the rare-earth doped optical fiber;
a monitoring light source that emits monitoring light having a wavelength shorter than that of the excitation light source;
an optical multiplexer that multiplexes the monitoring light emitted from the monitoring light source into the excitation light;
an optical demultiplexer that demultiplexes the monitoring light passing through the rare-earth doped optical fiber;
a passing light detector that detects light intensity of the monitoring light from the optical demultiplexer;
an output intensity changing unit that changes the output intensity of the excitation light source to light intensity previously determined;
a monitoring light control unit that maintains regular light intensity of the monitoring light emitted from the monitoring light source; and
a fixed light intensity comparator that detects a difference between the light intensity detected by the passing light detector and predetermined light intensity,
wherein the output intensity changing unit changes the output intensity of the excitation light source to light intensity previously determined according to the difference detected by the fixed light intensity comparator.

14. The fiber output stabilizer according to claim 13, wherein the wavelength of the monitoring light is shorter than an absorption wavelength band of the rare-earth element.

15. The fiber output stabilizer according to claim 13, wherein Yb is used as the rare-earth element, and
the wavelength of the monitoring light ranges from 600 nm to 850 nm.

16. A fiber output stabilizer comprising
a rare-earth doped optical fiber in which at least one kind of a rare-earth element is added to a core;
an excitation light source that supplies excitation light exciting the rare-earth element to the rare-earth doped optical fiber;
a monitoring light source that emits monitoring light having a wavelength shorter than that of the excitation light source;
an optical multiplexer that multiplexes the monitoring light emitted from the monitoring light source into the excitation light;
an optical demultiplexer that demultiplexes the monitoring light passing through the rare-earth doped optical fiber;
a passing light detector that detects light intensity of the monitoring light from the optical demultiplexer;
an output intensity changing unit that changes the output intensity of the excitation light source to light intensity previously determined; and one set of reflecting mirrors that is disposed at two points separated from each other in the rare-earth doped optical fiber, reflecting light radiated from the rare-earth element to perform laser oscillation in the rare-earth doped optical fiber.

17. The fiber output stabilizer according to claim 16, wherein the one set of reflecting mirrors is disposed in the way of an optical path between the optical multiplexer and the optical demultiplexer.

18. The fiber output stabilizer according to claim 16, wherein the optical multiplexer and the optical demultiplexer are disposed in the way of an optical path between the one set of reflecting mirrors.

19. The fiber output stabilizer according to claim 16, wherein the wavelength of the monitoring light is shorter than an absorption wavelength band of the rare-earth element.

20. The fiber output stabilizer according to claim 16, wherein Yb is used as the rare-earth element, and the wavelength of the monitoring light ranges from 600 nm to 850 nm.

21. A fiber output stabilizer comprising:
a rare-earth doped optical fiber in which at least one kind of a rare-earth element is added to a core;
an excitation light source that supplies excitation light exciting the rare-earth element to the rare-earth doped optical fiber;
a monitoring light source that emits monitoring light having a wavelength shorter than that of the excitation light source;
an optical multiplexer that multiplexes the monitoring light emitted from the monitoring light source into the excitation light;
an optical demultiplexer that demultiplexes the monitoring light passing through the rare-earth doped optical fiber;
a passing light detector that detects light intensity of the monitoring light from the optical demultiplexer;
an output intensity changing unit that changes the output intensity of the excitation light source to light intensity previously determined;
a disconnection detecting light source that emits disconnection detecting light having a wavelength longer than an absorption wavelength band of the rare-earth element to the rare-earth doped optical fiber; and
a disconnection detecting light detector that detects the disconnection detecting light passing through the rare-earth doped optical fiber.

22. The fiber output stabilizer according to claim 21, wherein the excitation light emitted from the excitation light source is stopped when light intensity of the disconnection detecting light detected by the disconnection detecting light detector is lower than a predetermined value.

23. A fiber output stabilizer comprising:
a rare-earth doped optical fiber in which at least one kind of a rare-earth element is added to a core;
an excitation light source that supplies excitation light exciting the rare-earth element to the rare-earth doped optical fiber;
a monitoring light source that emits monitoring light having a wavelength shorter than that of the excitation light source;
an optical multiplexer/demultiplexer that multiplexes the monitoring light emitted from the monitoring light source into the excitation light while demultiplexes the monitoring light reflected from the rare-earth doped optical fiber;
a monitoring light reflecting mirror that reflects the monitoring light passing through the rare-earth doped optical fiber toward the optical multiplexer/demultiplexer; and
a passing light detector that detects light intensity of the monitoring light from the optical demultiplexer.

24. The fiber output stabilizer according to claim 23, further comprising:
a monitoring light detector that detects light intensity of the monitoring light emitted from the monitoring light source;
a monitoring light intensity comparator that detects a difference between the light intensity detected by the passing light detector and the light intensity detected by the monitoring light detector; and
the output intensity changing unit that changes output intensity of the excitation light source to light intensity previously determined according to the difference detected by the monitoring light intensity comparator.

25. The fiber output stabilizer according to claim 23, further comprising:
a monitoring light control unit that maintains regular light intensity of the monitoring light emitted from the monitoring light source;
a fixed light intensity comparator that detects a difference between the light intensity detected by the passing light detector and predetermined light intensity; and
the output intensity changing unit that changes the output intensity of the excitation light source to light intensity previously determined according to the difference detected by the fixed light intensity comparator.

26. The fiber output stabilizer according to claim 23, further comprising one set of reflecting mirrors that is disposed at two points separated from each other in the rare-earth doped optical fiber, reflecting light radiated from the rare-earth element to perform laser oscillation in the rare-earth doped optical fiber.

* * * * *